(12) United States Patent
Scipioni et al.

(10) Patent No.: US 8,732,076 B2
(45) Date of Patent: May 20, 2014

(54) METHODS AND SYSTEMS FOR PROVIDING A SAVINGS GOAL

(75) Inventors: German Scipioni, San Jose, CA (US); Donald James Fotsch, Palo Alto, CA (US); Joseph Edward Black, San Francisco, CA (US); Amy Poling, San Jose, CA (US); Alp Tiritoglu, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 13/555,928

(22) Filed: Jul. 23, 2012

(65) Prior Publication Data

US 2012/0290367 A1 Nov. 15, 2012

Related U.S. Application Data

(63) Continuation of application No. 12/347,934, filed on Dec. 31, 2008, now Pat. No. 8,249,986.

(51) Int. Cl.
*G06Q 40/00* (2012.01)

(52) U.S. Cl.
USPC .............................................. 705/39; 705/40

(58) Field of Classification Search
USPC ..................................................... 705/10–44
See application file for complete search history.

(56) References Cited

U.S. PATENT DOCUMENTS

| | | |
|---|---|---|
| 3,983,481 A | 9/1976 | Nutt et al. |
| 5,331,353 A | 7/1994 | Levenson et al. |
| 5,485,518 A | 1/1996 | Hunter et al. |
| 5,500,513 A | 3/1996 | Langhans et al. |
| 5,706,442 A | 1/1998 | Anderson et al. |
| 5,778,178 A | 7/1998 | Arunachalam |
| 5,826,243 A * | 10/1998 | Musmanno et al. ............ 705/35 |
| 5,845,260 A | 12/1998 | Nakano et al. |
| 5,864,830 A | 1/1999 | Armetta et al. |
| 5,878,141 A | 3/1999 | Daly |
| 5,884,280 A | 3/1999 | Yoshioka et al. |
| 5,914,472 A | 6/1999 | Foladare |

(Continued)

FOREIGN PATENT DOCUMENTS

| | | |
|---|---|---|
| EP | 1291673 A2 | 3/2003 |
| JP | 2002366764 A | 12/2002 |

(Continued)

OTHER PUBLICATIONS

"Amazon Flexible Payments Service (Amazon FPS)", [Online]. Retrieved from the Internet: <URL: https://payments.amazon.com/sdui/sdui/business?sn=devfps/o>. (2009). 4 pgs.

(Continued)

*Primary Examiner* — Frantzy Poinvil
(74) *Attorney, Agent, or Firm* — Schwegman Lundberg & Woessner, P.A.

(57) ABSTRACT

Example embodiments describe a method and a system to control activities of a financial account. In example embodiments, a secondary account is linked to a primary account. Within the secondary account, a spending account and a savings account are established. A savings goal in the savings account of the secondary account that enables a portion of the savings account of the secondary account to be set aside is created. The savings goal includes a goal amount. An automatic purchase of a product associated with the savings goal upon the goal amount being met may be allowed.

21 Claims, 19 Drawing Sheets

(56) References Cited

U.S. PATENT DOCUMENTS

| | | | |
|---|---|---|---|
| 5,953,710 A | 9/1999 | Fleming | |
| 5,987,500 A | 11/1999 | Arunachalam | |
| 5,991,750 A | 11/1999 | Watson | |
| 6,021,943 A | 2/2000 | Chastain | |
| 6,029,147 A | 2/2000 | Horadan et al. | |
| 6,044,360 A | 3/2000 | Picciallo | |
| 6,047,270 A | 4/2000 | Joao et al. | |
| 6,055,360 A | 4/2000 | Inoue et al. | |
| 6,173,269 B1 | 1/2001 | Solokl et al. | |
| 6,212,556 B1 | 4/2001 | Arunachalam | |
| 6,219,650 B1 | 4/2001 | Friend et al. | |
| 6,235,176 B1 | 5/2001 | Schoen et al. | |
| 6,324,523 B1 | 11/2001 | Killeen, Jr. et al. | |
| 6,338,047 B1 | 1/2002 | Wallmann | |
| 6,381,582 B1 | 4/2002 | Walker et al. | |
| 6,522,395 B1 | 2/2003 | Bamji et al. | |
| 6,609,113 B1 | 8/2003 | O'Leary et al. | |
| 6,622,128 B1 | 9/2003 | Bedell et al. | |
| 6,732,919 B2 | 5/2004 | Macklin et al. | |
| 6,779,113 B1 | 8/2004 | Guthery | |
| 6,796,497 B2 | 9/2004 | Benkert et al. | |
| 6,991,157 B2 | 1/2006 | Bishop et al. | |
| 7,006,993 B1 | 2/2006 | Cheong et al. | |
| 7,031,939 B1 | 4/2006 | Gallagher et al. | |
| 7,103,576 B2 | 9/2006 | Mann, III et al. | |
| 7,117,173 B1 | 10/2006 | Ambani | |
| 7,133,840 B1 | 11/2006 | Kenna et al. | |
| 7,143,064 B2 | 11/2006 | Picciallo et al. | |
| 7,155,411 B1 | 12/2006 | Blinn et al. | |
| 7,171,382 B2 | 1/2007 | Beacham | |
| 7,184,979 B1 | 2/2007 | Carson | |
| 7,204,412 B2 | 4/2007 | Foss | |
| 7,340,423 B1* | 3/2008 | Blagg et al. | 705/35 |
| 7,343,335 B1 | 3/2008 | Olliphant | |
| 7,356,507 B2 | 4/2008 | Bezos et al. | |
| 7,398,252 B2 | 7/2008 | Neofytides et al. | |
| 7,401,731 B1 | 7/2008 | Pletz et al. | |
| 7,427,021 B2 | 9/2008 | Kemper et al. | |
| 7,428,518 B1 | 9/2008 | Zorba et al. | |
| 7,430,516 B1 | 9/2008 | Blair et al. | |
| 7,454,376 B1* | 11/2008 | Argenbright | 705/36 R |
| 7,499,875 B1 | 3/2009 | May et al. | |
| 7,533,113 B1 | 5/2009 | Haddad | |
| 7,546,945 B1 | 6/2009 | Bucci et al. | |
| 7,580,856 B1 | 8/2009 | Pliha | |
| 7,630,937 B1* | 12/2009 | Mo et al. | 705/39 |
| 7,640,336 B1 | 12/2009 | Lu et al. | |
| 7,765,583 B2 | 7/2010 | Kalonji et al. | |
| 7,827,247 B1 | 11/2010 | Spertus et al. | |
| 7,841,004 B1 | 11/2010 | Balducci et al. | |
| 7,860,936 B1 | 12/2010 | Newstadt et al. | |
| 7,890,422 B1 | 2/2011 | Hirka et al. | |
| 7,904,554 B1 | 3/2011 | Lu et al. | |
| 7,945,512 B2 | 5/2011 | Scipiuni et al. | |
| 7,958,019 B2 | 6/2011 | Ahmed et al. | |
| 7,975,299 B1 | 7/2011 | Balducci et al. | |
| 8,042,193 B1 | 10/2011 | Piliouras | |
| 8,056,118 B2 | 11/2011 | Piliouras | |
| 8,095,672 B1 | 1/2012 | Newstadt et al. | |
| 8,156,158 B2 | 4/2012 | Rolls et al. | |
| 8,200,554 B1* | 6/2012 | Foss et al. | 705/30 |
| 8,249,986 B2 | 8/2012 | Scipioni et al. | |
| 8,407,137 B2* | 3/2013 | Thomas | 705/38 |
| 8,606,713 B1* | 12/2013 | Ledder et al. | 705/42 |
| 2001/0056395 A1 | 12/2001 | Khan | |
| 2002/0016769 A1 | 2/2002 | Barbara et al. | |
| 2002/0055909 A1 | 5/2002 | Fung et al. | |
| 2002/0143647 A1 | 10/2002 | Headings et al. | |
| 2002/0174016 A1 | 11/2002 | Cuervo | |
| 2003/0028481 A1 | 2/2003 | Flitcroft et al. | |
| 2003/0088490 A1 | 5/2003 | Beacham | |
| 2003/0097331 A1 | 5/2003 | Cohen | |
| 2004/0039694 A1 | 2/2004 | Dunn et al. | |
| 2004/0192297 A1 | 9/2004 | Erskine et al. | |
| 2005/0096977 A1 | 5/2005 | Rossides | |
| 2005/0102221 A1 | 5/2005 | Sulkowski et al. | |
| 2005/0108117 A1 | 5/2005 | Newman | |
| 2006/0064378 A1 | 3/2006 | Clementz et al. | |
| 2006/0155617 A1 | 7/2006 | Dasilva | |
| 2006/0167791 A1 | 7/2006 | Hahn-Carlson | |
| 2006/0173792 A1 | 8/2006 | Glass | |
| 2006/0173793 A1 | 8/2006 | Glass | |
| 2007/0017976 A1 | 1/2007 | Peyret et al. | |
| 2007/0118475 A1 | 5/2007 | Picciallo et al. | |
| 2007/0156580 A1 | 7/2007 | Imrey et al. | |
| 2007/0198382 A1* | 8/2007 | Ferrari | 705/35 |
| 2007/0211651 A1 | 9/2007 | Ahmed et al. | |
| 2008/0015988 A1 | 1/2008 | Brown et al. | |
| 2008/0195510 A1 | 8/2008 | Olliphant | |
| 2008/0228615 A1 | 9/2008 | Scipioni et al. | |
| 2008/0228637 A1 | 9/2008 | Scipioni et al. | |
| 2008/0228638 A1 | 9/2008 | Scipioni et al. | |
| 2008/0235122 A1 | 9/2008 | Weitzman | |
| 2009/0112763 A1 | 4/2009 | Scipioni et al. | |
| 2009/0119207 A1 | 5/2009 | Grecia | |
| 2009/0327128 A1 | 12/2009 | Olliphant | |
| 2010/0191629 A1 | 7/2010 | Olliphant | |
| 2011/0004546 A1* | 1/2011 | Thomas | 705/39 |
| 2011/0010294 A1 | 1/2011 | Chenot | |
| 2011/0072039 A1 | 3/2011 | Tayloe | |
| 2011/0251901 A1 | 10/2011 | Kwon et al. | |
| 2012/0011594 A1 | 1/2012 | Nguyen | |
| 2012/0158593 A1 | 6/2012 | Garfinkle et al. | |
| 2012/0259768 A1 | 10/2012 | Mukherjee | |
| 2013/0110716 A1 | 5/2013 | Rekhi et al. | |
| 2013/0110720 A1 | 5/2013 | Rekhi et al. | |

FOREIGN PATENT DOCUMENTS

| | | |
|---|---|---|
| JP | 2004227467 A | 8/2004 |
| JP | 2006085256 A | 3/2006 |
| JP | 2009501981 A | 1/2009 |
| KR | 20010000457 A | 1/2001 |
| KR | 20040011401 A | 2/2004 |
| WO | WO-2006034265 A2 | 3/2006 |
| WO | WO-2006034265 A3 | 3/2006 |
| WO | WO-2007011840 A2 | 1/2007 |
| WO | WO-2008112303 A2 | 9/2008 |

OTHER PUBLICATIONS

"U.S. Appl. No. 09/633,962, Appeal Brief filed Oct. 11, 2005", 31 pgs.

"U.S. Appl. No. 09/633,962, Final Office Action mailed Feb. 7, 2005", 13 pgs.

"U.S. Appl. No. 09/633,962, Final Office Action mailed Nov. 28, 2003", 10 pgs.

"U.S. Appl. No. 09/633,962, Non Final Office Action mailed Feb. 16, 2006", 11 pgs.

"U.S. Appl. No. 09/633,962, Non Final Office Action mailed Jun. 5, 2003", 8 pgs.

"U.S. Appl. No. 09/633,962, Non Final Office Action mailed Sep. 14, 2004", 13 pgs.

"U.S. Appl. No. 09/633,962, Notice of Allowance mailed Oct. 17, 2007", 8 pgs.

"U.S. Appl. No. 09/633,962, Response filed Apr. 17, 2006 to Non Final Office Action mailed Feb. 16, 2006", 2 pgs.

"U.S. Appl. No. 09/633,962, Response filed May 28, 2004 to Final Office Action mailed Nov. 28, 2003", 11 pgs.

"U.S. Appl. No. 09/633,962, Response filed Aug. 28, 2003 to Non Final Office Action mailed Jun. 5, 2003", 6 pgs.

"U.S. Appl. No. 09/633,962, Response filed Oct. 28, 2004 to Non Final Office Action mailed Sep. 14, 2004", 16 pgs.

"U.S. Appl. No. 10/946,710, Advisory Action mailed Jul. 31, 2007", 3 pgs.

"U.S. Appl. No. 10/946,710, Appeal Brief Filed Mar. 20, 2008", 3 pgs.

"U.S. Appl. No. 10/946,710, Decision on Pre-Appeal Brief Request mailed Sep. 21, 2007", 2 pgs.

"U.S. Appl. No. 10/946,710, Examiner's answer mailed Oct. 9, 2008 to Appeal Brief filed Mar. 20, 2008", 10 pgs.

(56) References Cited

OTHER PUBLICATIONS

"U.S. Appl. No. 10/946,710, Examiner's Answer to Appeal Brief mailed Aug. 3, 2010", 7 pgs.
"U.S. Appl. No. 10/946,710, Final Office Action mailed Jan. 24, 2007", 7 pgs.
"U.S. Appl. No. 10/946,710, Final Office Action mailed Sep. 26, 2011", 8 pgs.
"U.S. Appl. No. 10/946,710, Non Final Office Action mailed May 18, 2006", 5 pgs.
"U.S. Appl. No. 10/946,710, Non Final Office Action mailed Apr. 6, 2011", 8 pgs.
"U.S. Appl. No. 10/946,710, Pre-Appeal Brief Request filed Jul. 24, 2007", 4 pgs.
"U.S. Appl. No. 10/946,710, Reply Bried filed Dec. 9, 2008", 4 pgs.
"U.S. Appl. No. 10/946,710, Response filed Feb. 28, 2007 to Final Office Action mailed Jan. 24, 2007", 10 pgs.
"U.S. Appl. No. 10/946,710, Response Filed Jun. 21, 2011 to Non-Final Office Action Received Apr. 6, 2011", 15 pgs.
"U.S. Appl. No. 10/946,710, Response filed Oct. 18, 2006 to Non Final Office Action mailed May 18, 2006", 8 pgs.
"U.S. Appl. No. 10/946,710, Response filed Dec. 27, 2011 to Final Office Action mailed Sep. 23, 2011", 13 pgs.
"U.S. Appl. No. 10/947,459, Advisory Action mailed Mar. 17, 2011", 3 pgs.
"U.S. Appl. No. 10/947,459, Appeal Brief filed May 19, 2011", 24 pgs.
"U.S. Appl. No. 10/947,459, Decision on Pre-Appeal Brief Request Apr. 24, 2011", 2 pgs.
"U.S. Appl. No. 10/947,459, Examiner's Answer to Appeal Brief Jun. 21, 2011", 14 pgs.
"U.S. Appl. No. 10/947,459, Final Office Action mailed Jan. 27, 2010", 6 pgs.
"U.S. Appl. No. 10/947,459, Final Office Action mailed Dec. 22, 2010", 13 pgs.
"U.S. Appl. No. 10/947,459, Non Final Office Action mailed Feb. 5, 2009", 6 pgs.
"U.S. Appl. No. 10/947,459, Non-Final Office Action mailed Jun. 29, 2009", 15 pgs.
"U.S. Appl. No. 10/947,459, Non-Final Office Action mailed Aug. 11, 2010", 14 pgs.
"U.S. Appl. No. 10/947,459, Pre-Appeal Brief Request Mar. 21, 2011", 6 pgs.
"U.S. Appl. No. 10/947,459, Response filed Feb. 14, 2011 to Final Office Action mailed Dec. 22, 2010", 12 pgs.
"U.S. Appl. No. 10/947,459, Response filed Mar. 18, 2009 to Non Final Office Action mailed Feb. 5, 2009", 8 pgs.
"U.S. Appl. No. 10/947,459, Response filed Apr. 27, 2010 to Final Office Action mailed Jan. 27, 2010", 11 pgs.
"U.S. Appl. No. 10/947,459, Response filed Sep. 29, 2009 to Non Final Office Action mailed Jun. 29, 2009", 10 pgs.
"U.S. Appl. No. 10/947,459, Response filed Nov. 12, 2010 to Non Final Office Action mailed Aug. 11, 2010", 11 pgs.
"U.S. Appl. No. 11/837,704, Appeal Brief filed Jan. 12, 2011", 16 pgs.
"U.S. Appl. No. 11/837,704, Decision on Pre-Appeal Brief Request Dec. 10, 2010", 2 pgs.
"U.S. Appl. No. 11/837,704, Final Office Action mailed Jul. 12, 2010", 8 pgs.
"U.S. Appl. No. 11/837,704, Final Office Action mailed Jul. 13, 2009", 10 pgs.
"U.S. Appl. No. 11/837,704, Non-Final Office Action mailed Jan. 27, 2010", 8 pgs.
"U.S. Appl. No. 11/837,704, Non-Final Office Action mailed Dec. 24, 2008", 6 pgs.
"U.S. Appl. No. 11/837,704, Notice of Allowance mailed Mar. 31, 2011", 7 pgs.
"U.S. Appl. No. 11/837,704, Pre-Appeal Brief Request filed Nov. 12, 2010", 5 pgs.
"U.S. Appl. No. 11/837,704, Response filed Mar. 24, 2009 to Non Final Office Action mailed Dec. 24, 2008", 12 pgs.
"U.S. Appl. No. 11/837,704, Response filed Apr. 26, 2010 to Non Final Office Action mailed Jan. 27, 20110", 12 pgs.
"U.S. Appl. No. 11/837,704, Response filed Nov. 13, 2009 to Final Office Action mailed Jul. 13, 2009", 10 pgs.
"U.S. Appl. No. 11/837,720, Advisory Action mailed Aug. 30, 2010", Advisory Action, 2 pgs.
"U.S. Appl. No. 11/837,720, Appeal Bried filed Jun. 16, 2011", 25 pgs.
"U.S. Appl. No. 11/837,720, Decision on Pre-Appeal Brief Request May 16, 2011", 2 pgs.
"U.S. Appl. No. 11/837,720, Examiner's Answer to Appeal Brief mailed Aug. 10, 2011", 26 pgs.
"U.S. Appl. No. 11/837,720, Final Office Action mailed Mar. 7, 2011", 19 pgs.
"U.S. Appl. No. 11/837,720, Final Office Action mailed Mar. 24, 2011", 17 pgs.
"U.S. Appl. No. 11/837,720, Final Office Action mailed Jun. 15, 2010", 17 pgs.
"U.S. Appl. No. 11/837,720, Final Office Action mailed Jun. 25, 2009", 20 pgs.
"U.S. Appl. No. 11/837,720, Non Final Office Action mailed Nov. 20, 2008", 18 pgs.
"U.S. Appl. No. 11/837,720, Non-Final Office Action mailed Sep. 16, 2010", 18 pgs.
"U.S. Appl. No. 11/837,720, Non-Final Office Action mailed Dec. 10, 2009", 16 pgs.
"U.S. Appl. No. 11/837,720, Pre-Appeal Brief Request filed Apr. 28, 2011", 5 pgs.
"U.S. Appl. No. 11/837,720, Reply Brief filed Sep. 6, 2011", 6 pgs.
"U.S. Appl. No. 11/837,720, Response filed Mar. 10, 2010 to Non Final Office Action mailed Dec. 10, 2009", 11 pgs.
"U.S. Appl. No. 11/837,720, Response filed Mar. 20, 2009 to Non Final Office Action mailed Nov. 20, 2009", 14 pgs.
"U.S. Appl. No. 11/837,720, Response filed Aug. 16, 2010 to Final Office Action mailed Jun. 16, 2010", 11 pgs.
"U.S. Appl. No. 11/837,720, Response filed Sep. 24, 2009 to Final Office Action mailed Jun. 25, 2009", 11 pgs.
"U.S. Appl. No. 11/837,720, Response filed Dec. 16, 2010 to Non Final Office Action mailed Sep. 16, 2010", 11 pgs.
"U.S. Appl. No. 12/025,223, Advisory action mailed Mar. 1, 2012", 3 pgs.
"U.S. Appl. No. 12/025,223, Decision on Pre-Appeal Bried mailed Apr. 17, 2012", 2 pgs.
"U.S. Appl. No. 12/025,223, Final Office Action mailed Dec. 6, 2011", 10 pgs.
"U.S. Appl. No. 12/025,223, Non Final Office Action mailed Jun. 24, 2011", 12 pgs.
"U.S. Appl. No. 12/025,223, Notice of Allowance mailed Jun. 22, 2012", 10 pgs.
"U.S. Appl. No. 12/025,223, Pre-Appeal Brief filed Mar. 6, 2012", 7 pgs.
"U.S. Appl. No. 12/025,223, Response filed Feb. 6, 2012 to Final Office Action mailed Dec. 6, 2011", 21 pgs.
"U.S. Appl. No. 12/025,223, Response filed Aug. 25, 2011 to Non Final Office Action mailed Jun. 24, 2011", 19 pgs.
"U.S. Appl. No. 12/110,944, Appeal Brief filed Dec. 9, 2010", 28 pgs.
"U.S. Appl. No. 12/110,944, Decision on Pre-Appeal Brief Request mailed Nov. 10, 2010", 2 pgs.
"U.S. Appl. No. 12/110,944, Examiner's Answer to Appeal Brief mailed Mar. 15, 2011", 15 pgs.
"U.S. Appl. No. 12/110,944, Final Office Action mailed Jul. 1, 2010", 13 pgs.
"U.S. Appl. No. 12/110,944, Non-Final Office Action mailed Apr. 20, 2009", 13 pgs.
"U.S. Appl. No. 12/110,944, Non-Final Office Action mailed Dec. 28, 2009", 18 pgs.
"U.S. Appl. No. 12/110,944, Pre-Appeal Brief Request mailed Sep. 30, 2010", 9 pgs.
"U.S. Appl. No. 12/110,944, Response filed Mar. 25, 2010 to Non Final Office Action mailed Dec. 28, 2009", 2 pgs.
"U.S. Appl. No. 12/110,944, Response filed Aug. 20, 2009 to Non Final Office Action mailed Apr. 20, 2009", 14 pgs.

(56) References Cited

OTHER PUBLICATIONS

"U.S. Appl. No. 12/347,934, Advisory Action mailed Mar. 24, 2010", 2 pgs.
"U.S. Appl. No. 12/347,934, Final Office Action mailed Jan. 5, 2010", 8 pgs.
"U.S. Appl. No. 12/347,934, Final Office Action mailed Aug. 19, 2011", 10 pgs.
"U.S. Appl. No. 12/347,934, Final Office Action mailed Oct. 27, 2010", 8 pgs.
"U.S. Appl. No. 12/347,934, Non Final Office Action mailed Feb. 22, 2011", 9 pgs.
"U.S. Appl. No. 12/347,934, Non Final Office Action mailed May 14, 2010", 7 pgs.
"U.S. Appl. No. 12/347,934, Non Final Office Action mailed Jun. 29, 2009", 8 pgs.
"U.S. Appl. No. 12/347,934, Notice of Allowance mailed Jun. 27, 2012", 8 pgs.
"U.S. Appl. No. 12/347,934, Response filed Jan. 27, 2011 to Final Office Action mailed Oct. 27, 2010", 9 pgs.
"U.S. Appl. No. 12/347,934, Response filed Mar. 5, 2010 to Final Office Action mailed Jan. 5, 2010", 9 pgs.
"U.S. Appl. No. 12/347,934, Response filed Apr. 5, 2010 to Advisory Action mailed Mar. 24, 2010", 9 pgs.
"U.S. Appl. No. 12/347,934, Response filed May 23, 2011 to Non-Final Office Action Received Feb. 22, 2011", 10 pgs.
"U.S. Appl. No. 12/347,934, Response filed Aug. 16, 2010 to Non Final Office Action mailed May 14, 2010", 9 pgs.
"U.S. Appl. No. 12/347,934, Response filed Sep. 29, 2009 to Non Final Office Action mailed Jun. 29, 2009", 8 pgs.
"U.S. Appl. No. 12/347,934, Response filed Oct. 10, 2011 to Final Office Action mailed Aug. 19, 2011", 12 pgs.
"U.S. Appl. No. 12/554,785, Response filed Jan. 17, 2012 to Non Final Office Action mailed Sep. 16, 2011", 9 pgs.
"U.S. Appl. No. 12/554,785, Non Final Office Action mailed Mar. 30, 2012", 9 pgs.
"U.S. Appl. No. 12/554,785, Non Final Office Action mailed Sep. 16, 2011", 10 pgs.
"U.S. Appl. No. 12/554,785, Response filed Jul. 2, 2012 to Non Final Office Action mailed Mar. 30, 2012", 8 pgs.
"U.S. Appl. No. 12/752,976, Final Office Action mailed Jul. 5, 2012", 9 pgs.
"U.S. Appl. No. 12/752,976, Non Final Office Action mailed Jan. 27, 2012", 10 pgs.
"U.S. Appl. No. 12/752,976, Response filed Apr. 27, 2012 to Non Final Office Action mailed Jan. 27, 2012", 9 pgs.
"U.S. Appl. No. 12/752,976, Non Final Office Action mailed Jul. 3, 2012", 15 pgs.
"Bank of America website", [Online]. Retrieved from the Internet: <URL: http://www.bankofamerica.com/financialtools/index.cfm?view=planning&calcid=savings04>, (Accessed Apr. 23, 2007), 2 pgs.
"Chinese Application Serial No. 200880008200.4, Office Action mailed Mar. 26, 2012", w/English Translation of claims, 10 pgs.
"Chinese Application Serial No. 20080008200.4, Response filed Oct. 26, 2011 to Office Action mailed Jul. 11, 2011", 5 pgs.
"Chinese Application Serial No. 200800082004, Office Action mailed Jul. 11, 2011", with English translation of claims, 5 pgs.
"Financial Cards in Italy", Euromonitor International, [Online]. Retrieved from the Internet. <URL: http://www.euromonitor.com/Financial_Cards_in_Italy>, (2007), 5 pgs.
"International Application Serial No. PCT/US2005/033640, Written Opinion mailed Oct. 12, 2006", 5 pgs.
"International Application Serial No. PCT/US2005/033640, International Preliminary Report on Patentability mailed Apr. 5, 2007", 5 pgs.
"International Application Serial No. PCT/US2005/033640, International Search Report mailed Oct. 12, 2006", 4 pgs.
"International Application Serial No. PCT/US2008/003410, International Preliminary Report on Patentability mailed Sep. 24, 2009", 7 pgs.
"International Application Serial No. PCT/US2008/003410, Search Report mailed Nov. 5, 2008", 6 pgs.
"International Application Serial No. PCT/US2008/003410, Written Opinion mailed Nov. 5, 2008", 4 pgs.
"Japanese Application Serial No. 2009-553640, Appeal on Adverse Decision Response filed Mar. 1, 2012", With English translation of claims. 21 pgs.
"Japanese Application Serial No. 2009-553640, Final Office Action mailed Nov. 1, 2011", with English translation, 7 pgs.
"Japanese Application Serial No. 2009-553640, Notice of Allowance mailed May 22, 2012", w/English translation.
"Japanese Application Serial No. 2009-553640, Office Action mailed Apr. 10, 2012", 2 pgs.
"Japanses Application Serial No. 2009-553640, Office Action mailed Jun. 21, 2011", with English translation, 7 pgs.
"Japanese Application Serial No. 2009-553640, Office Action mailed Nov. 1, 2011", with English translation, 7 pgs.
"Japanese Application Serial No. 2009-553640, Response filed Apr. 18, 2012 to Office Action mailed Apr. 10, 2012", 4 pgs.
"Japanese Application Serial No. 2009-553640, Response filed Sep. 2, 2011 to Office Action mailed Jun. 21, 2011", 9 pgs.
"Korean Application Serial No. 2009-7021339, Office Action mailed Mar. 17, 2011", with English translation of claims, 5 pgs.
"Korean Application Serial No. 2009-7021339, Office Action mailed Nov. 22, 2011", with English translation of claims, 7 pgs.
"Korean Application Serial No. 2009-7021339, Office Action Response filed Feb. 22, 2012", With English translation of claims, 20 pgs.
"Korean Application Serial No. 2009-7021339, Office Action mailed Apr. 7, 2011", with English translation of claims, 5 pgs.
"USAA youth banking", Tools to teach your child financial responsibility, https://www.usaa.com/inet/ent_utils/McStaticPages?key=bank_youth , 1 pg.
"Yahoo Wallet", Yahoo!, Inc., [Online]. Retrieved from the Internet: <URL:http://wallet.yahoo.com/>, (2005), 1 pg.
CNN Money, "Start Your Kids Saving Early", [Online]. Retrieved from the Internet: <URL: http://money.ccn.com/1999/10/26/banking/q_kidsbank/, (Oct. 26, 1999), 4 pgs.
Jagolinzer, Philip. "Personal Financial Planning: How to divide the family income", Ohio CPA Journal vol. 54, No. 2, (Apr. 1995), 39-40.
"U.S. Appl. No. 13/080,308, Response filed Oct. 3, 2012 to Non Final Office Action mailed Jul. 3, 2012", 11 pgs.
"U.S. Appl. No. 13/080,308, Non Final Office Action mailed Nov. 30, 2012", 22 pgs.
"U.S. Appl. No. 13/286,938, Final Office Action mailed Feb. 4, 2013", 10 pgs.
"U.S. Appl. No. 13/286,938, Non Final Office Action mailed Aug. 30, 2012", 19 pgs.
"U.S. Appl. No. 13/286,938, Response filed Nov. 30, 2012 to Non-Final Office Action mailed Aug. 30, 2012", 11 pgs.
"U.S. Appl. No. 13/543,073, Final Office Action mailed Jan. 7, 2013", 9 pgs.
"U.S. Appl. No. 13/543,073, Non Final Office Action mailed Aug. 31, 2012", 18 pgs.
"U.S. Appl. No. 13/543,073, Response filed Nov. 30, 2012 to Non-Final Office Action mailed Aug. 31, 2012", 13 pgs.
"Korean Application Serial No. 2009-7021339, Examiners Final Rejection mailed Aug. 27, 2012", with English translation of claims, 9 pgs.
Warmund, Joshua, "Can COPPA Work? An Analysis of the Parental Consent Measures in the Children's Online Privacy Protection Act", Fordham Intell. Prop. Media & Ent. L.J. vol. 11:189, (Dec. 28, 2000), 191-216.
Whitman, Matthew, "Is Myspace a Good Kids' Space? A Look At the Implications of the Jan. 2008 Myspace—Attorneys General Agreement Concerning Online Age Verification", 1/S A Journal of Law and Policy for the Information Society vol. 4:3, (2008), 726-749.
"U.S. Appl. No. 13/080,308, Final Office Action mailed May 31, 2013", 24 pgs.
"U.S. Appl. No. 13/080,308, Response filed Apr. 1, 2013 to Non Final Office Action mailed Nov. 30, 2012", 11 pgs.
"U.S. Appl. No. 13/286,938, Response filed May 6, 2013 to Final Office Action mailed Feb. 4, 2013", 11 pgs.

(56) References Cited

OTHER PUBLICATIONS

"U.S. Appl. No. 13/543,073, Non Final Office Action mailed May 24, 2013", 14 pgs.

"U.S. Appl. No. 13/543,073, Response filed Apr. 8, 2013 to Final Office Action mailed Jan. 7, 2013", 12 pgs.

"U.S. Appl. No. 12/110,944, Appeal Decision mailed Aug. 27, 2013", 10 pgs.

"U.S. Appl. No. 12/110,944, Notice of Allowance mailed Sep. 27, 2013", 13 pgs.

"U.S. Appl. No. 13/080,308, Advisory Action mailed Aug. 16, 2013", 3 pgs.

"U.S. Appl. No. 13/080,308, Decision on Pre-Appeal Brief mailed Sep. 25, 2013", 2 pgs.

"U.S. Appl. No. 13/080,308, Examiner Interview Summary mailed Aug. 16, 2013", 2 pgs.

"U.S. Appl. No. 13/080,308, Pre-Appeal Brief Request filed Sep. 3, 2013", 5 pgs.

"U.S. Appl. No. 13/543,073, Final Office Action mailed Aug. 26, 2013", 17 pgs.

"Japanese Application Serial No. 2012-045133, Notice of Allowance mailed Sep. 17, 2013", 6 pgs.

"U.S. Appl. No. 13/080,308, Response filed Jul. 29, 2013 to Final Office Action mailed May 31, 2013", 13 pgs.

"U.S. Appl. No. 13/286,938, Non Final Office Action mailed Jul. 23, 2013", 10 pgs.

"U.S. Appl. No. 13/543,073, Response filed Aug. 6, 2013 to Non Final Office Action mailed May 24, 2013", 15 pgs.

"Korean Application Serial No. 2012-7031062, Office Action mailed Jun. 26, 2013", with English translation of claims, 5 pgs.

\* cited by examiner

| MY ACCOUNT | SEND MONEY | REQUEST MONEY | MERCHANT SERVICES | AUCTION TOOLS |
|---|---|---|---|---|
| OVERVIEW | ADD FUNDS | WITHDRAW | HISTORY | RESOLUTION CENTER | PROFILE |

MY ACCOUNT OVERVIEW

WELCOME, STEVEN SMITH<SSMITH123@YAHOO.COM> EDIT PROFILE
ACCOUNT TYPE: PERSONAL
STATUS: UNVERIFIED

PAYPAL BALANCE     VIEW LIMITS | MANAGE CURRENCY

| CURRENCY | BALANCE |
|---|---|
| U.S. DOLLAR (PRIMARY) | $3.20 USD |

CREATE NEW ACCOUNT

CHILD ACCOUNT

| | SPENDING | SAVINGS |
|---|---|---|
| TOMMY JR. | $35.66 | $1101.00 |
| SAMANTHA | $45.25 | $927.37 |

▽ TO DO LIST (2)

CONFIRM EMAIL — SEND YOU AN EMAIL TO CONFIRM YOUR PASSWORD.

APPROVE PENDING TRANSACTIONS ALLOWS YOU TO APPROVE PENDING TRANSACTIONS FROM YOUR TEEN ACCOUNT

DOUBLE CLICK PROMOTION

ACCOUNT ACTIVITY (HISTORY): ALL ACCOUNT ACTIVITY | PAYMENT RECEIVED | PAYMENTS SENT

RECENT ACTIVITY

| FILE | TYPE | TO/FROM | NAME/EMAIL/PHONE | AMOUNT | DATE | STATUS | DETAILS | ACTION |
|---|---|---|---|---|---|---|---|---|
| ☐ | TRANSFER(CREDIT) | TO U.S. DOLLAR BALANCE | FROM POUND STERLING | $0.97 USD | DEC 21, 2006 | COMPLETED | DETAILS | |
| ☐ | TRANSFER(DEBIT) | FROM POUND STERLING BALANCE | TO U.S. DOLLAR | -£0.51 GBP | DEC 21, 2006 | COMPLETED | DETAILS | |
| ☐ | TRANSFER(CREDIT) | TO U.S. DOLLAR BALANCE | FROM AUSTRALIAN DOLLAR | $0.97 USD | DEC 21, 2006 | COMPLETED | DETAILS | |
| ☐ | TRANSFER(DEBIT) | FROM AUSTRALIAN DOLLAR BALANCE | TO U.S. DOLLAR | -$1.27 AUD | DEC 21, 2006 | COMPLETED | DETAILS | |

FILE SELECTED ITEMS | FILE ALL

NICKNAME: TOMMY JR.
LEGAL NAME: THOMAS SMITH JR.
CHILD'S EMAIL ADDRESS: TOMMY1@YAHOO.COM
CHANGE

510 — ▽ SPENDING  $35.66
520 — ▽ SAVINGS  EARNING 5.00%  $1101.00
                                TOTAL: $1136.66
530 — ▽ TRANSFER MONEY  SCHEDULED(0)  RECURRING(2)
540 — ▽ SECURITY  LEVEL: HIGH

560 — ACCOUNT STYLE: TEEN  ▽  VIEW ACCOUNT
570 — ACCOUNT STATUS: ENABLE  PARENTAL SUSPENSION  ▽
580 — SUSPEND UNTIL: 315

EDUCATIONAL DEMO

550 — RECENT ACTIVITY

| FILE | TYPE | TO/FROM | NAME/EMAIL/PHONE | AMOUNT | DATE | STATUS | DETAILS | ACTION |
|---|---|---|---|---|---|---|---|---|
| | DEPOSIT | FROM PARENT ACCOUNT | MYOURDAD@YAHOO.COM | $5.00USD | DEC 21, 2006 | COMPLETED | DETAILS | |
| | TRANSFER | TO SAVINGS | TOMMY2@YAHOO.COM | $5.00USD | DEC 21, 2006 | COMPLETED | DETAILS | |
| | TRANSFER | FROM PARENT ACCOUNT | MYOURDAD@YAHOO.COM | $5.00USD | DEC 21, 2006 | COMPLETED | DETAILS | |
| | PAYMENT | TO FREDDIE | FREDDIE1999@YAHOO.COM | $5.00USD | DEC 21, 2006 | PENDING | DETAILS | APPROVE |

METHODS AND SYSTEMS FOR PROVIDING A SAVINGS GOAL

RELATED APPLICATIONS

This patent application is a continuation of U.S. patent application Ser. No. 12/347,934 filed Dec. 31, 2008 now U.S. Pat. No. 8,249,986 and entitled "METHODS AND SYSTEMS OF CONTROLLING ACTIVITIES OF FINANCIAL ACCOUNTS," which claims the benefit of U.S. patent application Ser. No. 11/837,704 filed Aug. 13, 2007 and entitled "SPENDING AND SAVINGS SECONDARY LINKED ACCOUNTS," which claims the benefit of U.S. Provisional Patent Application Ser. No. 60/894,875 filed Mar. 14, 2007 and entitled "CONTROLLED SPENDING AND SAVINGS SECONDARY ACCOUNTS", the contents of which are incorporated by reference herein in their entirety.

This application is also related to co-pending U.S. patent application Ser. No. 12/110,944, entitled "GRADUAL CONVERSION OF FINANCIAL ACCOUNTS," filed on Apr. 28, 2008.

BACKGROUND

Dependents, employees, business associates, family members, and others may have a difficult time with disciplined adherence to a budget, saving for specific items in the long-term, appropriately prioritizing spending, spending habits, and money management in general. Often, money is spent spontaneously such that there is often not enough money left in a budget to buy high priority items. Many are then forced to go over budget and borrow money or take out lines of credit to pay for these high priority items. In most instances, paying back the funds borrowed or taken out on credit may be difficult, expensive, and prolonged. Existing money management systems may be too conceptual, too expensive, or too restrictive.

Also, parents may not be able to appropriately discern motives of others that may intend to transfer funds to their children's accounts. For example, predators may offer to transfer funds to young account holders as a way to gain trust from them.

BRIEF DESCRIPTION OF THE DRAWINGS

Embodiments of the present invention are illustrated by way of example and not limitation in the Figures of the accompanying drawings, in which like references indicate similar elements and in which:

FIG. 4 to FIG. 11 illustrate primary account administration interfaces according to example embodiments.

FIG. 12 to FIG. 17 illustrate secondary account administration interfaces according to example embodiments.

DETAILED DESCRIPTION

Figure 1:
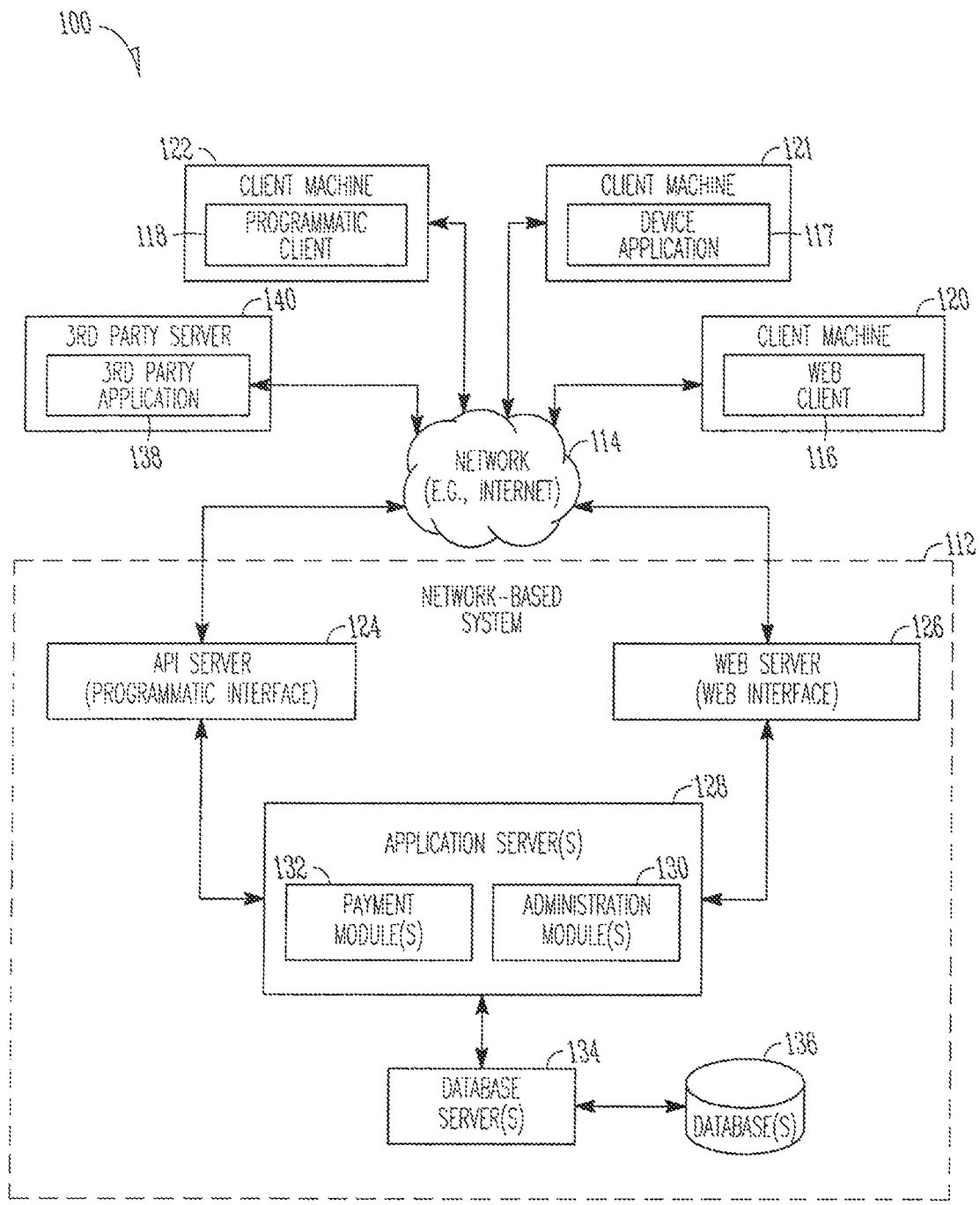
FIG. 1 illustrates a network diagram depicting a system, according to an example embodiment of the present invention, having client-server architecture.

Embodiments describe a method and a system to control access to funds and activities relating to a financial account using an account management module. Controlling may include spending control relating to one or more of categories and merchants.

In an example embodiment, a secondary account is linked to a primary account. Within the secondary account, a spending account and a savings account are established. A savings goal in the savings account of the secondary account that enables a portion of the savings account of the secondary account to be set aside is created. The savings goal includes a goal amount. An automatic purchase of a product associated with the savings goal upon the goal amount being met may be allowed.

In the following description, for purposes of explanation, numerous specific details are set forth in order to provide a thorough understanding of embodiments of the present invention. It will be evident, however, to one skilled in the art that embodiments of the present invention may be practiced without these specific details.

In example embodiments, a computer system (e.g., a client machine, server machine, etc.) configured by an application may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

FIG. 1 illustrates a network diagram depicting a system 100 having a client-server architecture, according to an example embodiment. A system, in the example form of a network-based system 112, provides server-side functionality, via a network 114 (e.g., the Internet, a public or private telephone network (wireline or wireless), a private wireless network using technologies such as Bluetooth or IEEE 802.11x or other networks) to one or more clients. FIG. 1 illustrates, for example, a web client 116 (e.g., a browser, such as the INTERNET EXPLORER® browser developed by MICROSOFT®) executing on client machine 120, e.g. on a network-based device. A device application 117 may execute on a client machine 121. A programmatic client 118 may execute on client machine 122. Further, while the system 100 shown in FIG. 1 employs a client-server architecture, embodiments are of course not limited to such an architecture, and could equally well find applications in a distributed, or peer-to-peer, architecture system.

The client machines, including network-based device(s) 120, 121, 122, may include a mobile device, a palmtop computer, a laptop computer, a desktop computer, a personal digital assistant, a cellular telephone, a communications device, a wireless telephone, a land-line telephone, a control system, a camera, a scanner, a television, television cable, a telephone with a web browser, a facsimile machine, a printer, a pager, and/or a personal trusted device. The device 120, 121, 122 may include a card, such as a smart card, a magnetic card, and/or a key card. The device may include a telephone or any device capable of Short Messaging Service (SMS) messaging, multimedia messaging service (MMS) messaging and/or generating audio tones, such as dual-tone multi-frequency (DTMF) tones. The device may be browser-enabled. The device may engage in an interactive message and/or open communication session, such as SMS, electronic mail, xHTML, Wireless Application Protocol (WAP), web, interactive voice response (IVR) and/or other mobile interfaces. The communication session between a client machine and the network-based system may involve multiple technology modalities, e.g. the client user may engage the system via SMS and receive a responsive communication as an SMS with an embedded hyperlinked URL directing the client user's device to a WAP or web page. A hyperlinked URL may be delivered directly to the device from the application server(s) 128 and may be used to access a web site or a microbrowser, such as a WAP site. The device 120, 121, 122 may enable mobile videophone communications, digital television signals, and/or digital radio signals. The device may include a receiver to receive near field communications as described in more detail herein. The scanner device may include a bar code reader/scanner, a Radio Frequency interface System (RFIS) reader, and/or a symbol reader/scanner.

At least one of the devices 120, 121 or 122 may be associated with a primary account holder. At least one of the devices 120, 121 or 122 may be associated with a secondary account holder. In various examples, the secondary account holder may be a relative of, a dependent of, or a business associate of the primary account holder.

Turning specifically to the network-based system 112, an Application Program Interface (API) server 124, and a web server 126 may be coupled to, and may provide programmatic, interfaces to, one or more application servers 128. The devices may use one or more of these interfaces to access the application server(s) 128.

For example, the web client, 116 may access the application server(s) 128 via the web interface supported by the web server 126. The web interface may include a web browser or any microbrowser, such as xHTML or WAP. Similarly, the programmatic client 118 accesses the various services and functions provided by the application server(s) 128, via the programmatic interface provided by the API server 124 and/or the web server 126. In an additional embodiment, an application supported by one or more applications of the application server(s) may be downloadable to the network-based device. The device(s) may host the interface associated with the one or more applications of the application server(s) 128. The interface on the device may be an API interface, an SMS interface, a web interface, and/or an IVR interface. Consumer wireless device platforms, such as Java 2 Platform Micro Edition (J2ME), J2SE and J2EE allow developers to use Java and a wireless toolkit to create applications and programs for the device 122. The J2ME interface may include an application programming interface (API) for the device. The application of the programmatic client may also access the Internet using, for example, Binary Runtime Environment for Wireless (BREW).

The device application 117 executed on the client machine 121 may access the application server(s) 128 via the web interface of the web server. The application 117 may be selected on the device and launched in a background. The application 117 may additionally or alternatively access the server(s) 128 via the programmatic interface of the API server 124. In an embodiment, the downloaded application described herein may include the device application 117.

The application server(s) 128 may host one or more administration module(s) 130 and one or more payment module(s) 132. The application server(s) 128 are, in turn, shown to be coupled to one or more database servers 134 that facilitate access to one or more databases 136. The administration module(s) 130 may provide for administration of various accounts, as discussed in more detail herein.

A third party application 138 executing on a third party server 140 may present offers to the account holder, such as goods and services. The third party may also be an acquaintance of the account holder(s), or may be a vendor or merchant.

The payment module(s) 132 may provide a number of payment services and functions to users, such as client users. The payment module(s) 132 may allow users to accumulate value (e.g., in a commercial currency, such as the U.S. dollar, or a proprietary currency, such as "points") in accounts, and then later to redeem the accumulated value via several possible avenues, as described in more detail herein. The payment module may also extend credit to user, and/or may also have access to other funding sources to complete transactions—e.g., a credit card, a bank account, and/or a credit line. The payment module may operate as a money transmitter, for instance, and may operate using the payment module(s) 132.

The third party, with whom a client user (or account holder) may transact, may receive from the payment module(s): information regarding a requested order for a product, a service, or a donation amount, information regarding the shipment address specified by the client user, and payment confirmation. The payment module(s) may secure financial information of the client user with respect to the third party.

The device 120, 121, or 122 may host the interface associated with the payment module(s) 132 of the server(s) 128. The web client 116, the device application 117, and/or the programmatic client 118 may be associated with the account management module(s) 130 and/or the payment module(s) 132.

The payment modules 132 may also be implemented as a standalone software program, which does not necessarily have networking capabilities. In this embodiment, the device may be directly connected to the payment module(s) 132, without using the network 114.

The payment module(s) may have access to the database 136 having, for example, the personal user account information through, for example, the database server(s) 134. The user account information may include payment information associated with the client user and an address destination of the client user, for example.

The user account may refer to the primary account and/or to the secondary account. When transactions are conducted from either account, the primary account holder may be considered as the contact point, for example, a shipping address is that of the primary account holder. The web client 116, the device application 117, and/or the programmatic client 118 may operate a program supported by the one or more database server(s) 134. The database server(s) 134 may support one or more account information links on a user interface of the network-based device, for example, using the web client 116. By accessing the database server(s) 134, the client user may add, amend or delete account information of the client user, among other information, as described in more detail herein, such as a default shipment address, and a default payment method.

The network 114 may include a mobile telephone network, a wireless wide area network (WWAN), a wireline telephone network, a wireless local area network (wireless LAN or WLAN), a wireless Metropolitan Area Network (MAN), and/or a wireless personal area network (PAN) (e.g., a Bluetooth® network). Other network-based technologies that may be used to connect include PON, VSAT satellite. Micro-impulse Radar, Radio Frequency identification (RFID), UltraWide Band, and/or Infrared. The network-based device may connect to the web using mobile internet exchange, e.g. Wireless Application Protocol (WAP) and/or Hypertext Transport Protocol (HTTP).

The network 114 may allow the network-based device 120, 121, 122 to communicate with the third party, e.g. a vendor or a charity, and/or to communicate with the payment module(s) and/or the financial service provider, among others having the capability to communicate through any various means. The primary account holder may allow, limit or restrict such communications from and/or to the secondary account holder. For example, the primary account holder may have communications linked to the secondary account to be approved first before being transmitted from or received by the secondary account holder.

FIG. 1 also illustrates the third party application 138 as having programmatic access to the network-based system 112 via the programmatic interface provided by the API server 124.

Figure 2:
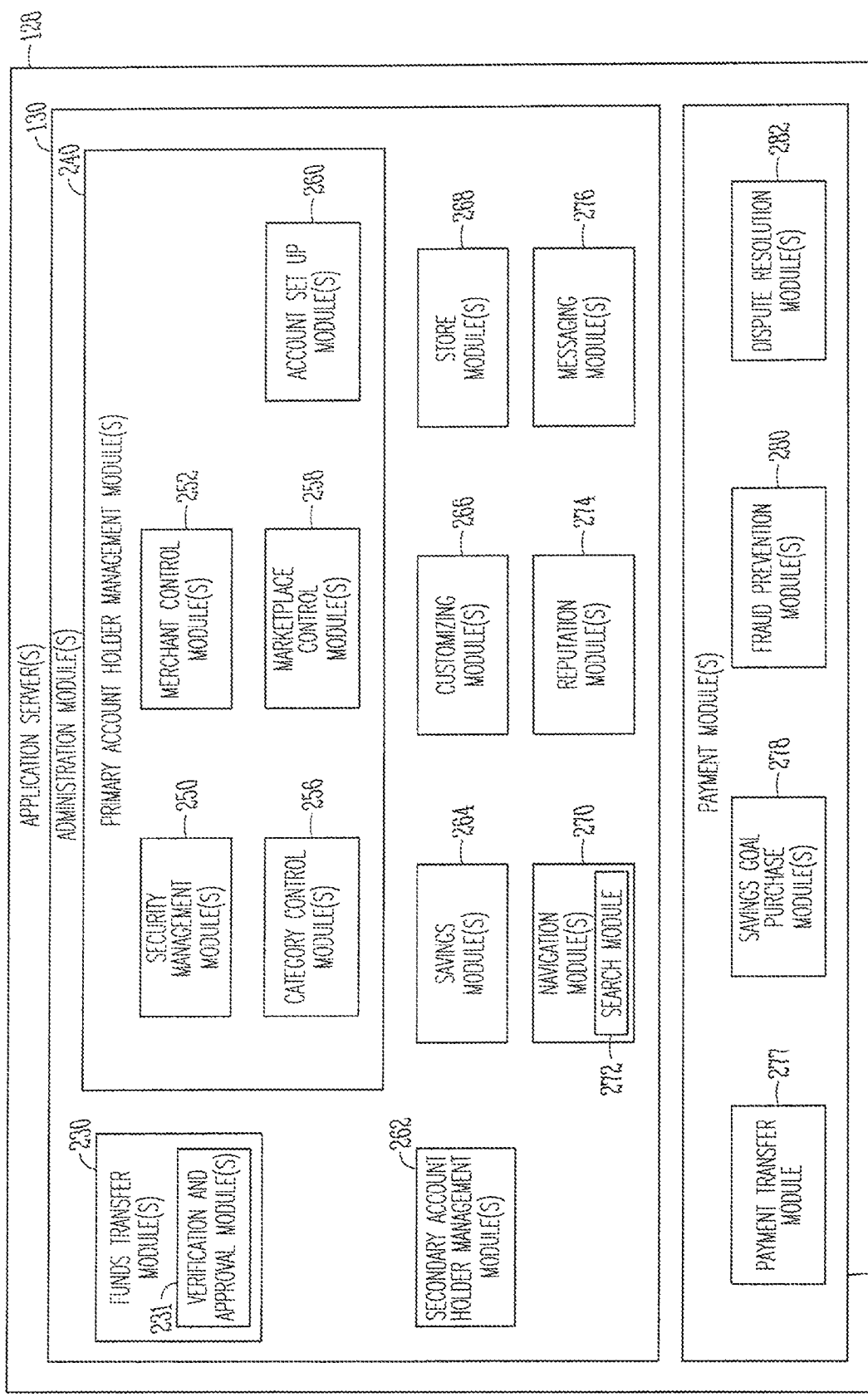
FIG. 2 illustrates a block diagram showing an application server in an example embodiment of the present invention.

FIG. 2 illustrates a block diagram showing application server(s) 128 that are part of the network-based system 112, in an example embodiment of the present invention. In this embodiment, the payment module(s) 132 and the administration module(s) 130 may be hosted by the application server(s) 128 of the network-based system 112.

The account management module(s) 240 may be configured to set up, manage, and control the primary and secondary accounts.

The account set up module 260 may be configured to set up a primary account and a secondary account linked to the primary account. Details of these accounts may be stored in the database tables 300, as described below. The secondary account may include sub-accounts, such as a spending account and a savings account. The administration module 130 may also include a primary account holder management module (account management module) 240 associated with the primary account. The account management module 240 may be configured to enable controlled access with respect to a secondary account holder to funds in the secondary account.

The account management module(s) 240 may be configured to permit the primary account holder to control the secondary account in various ways: ways to access funds (examples include: online, mobile payments, debit card, send money), spending limits, spending limits in certain categories, limit or control transfer capabilities (e.g., between the spending and saving accounts), limit or control purchase capabilities (e.g., on line layaway), limit or control deposit control (e.g., approve deposits from different sources into secondary accounts), limit or control automatic debit capabilities (e.g., a car insurance payment for insurance that the primary user may be ultimately responsible for), limit or control automatic deposit capabilities, limit or control purchasing categories, limit or control purchasing merchants, limit or control visibility of advertisements or marketing within an interface of the secondary account, and other administrative functions. In an example, the primary account holder may be permitted to place restrictions on fund transfers to/from the secondary account. In another example, the primary account holder may suspend the secondary account, as described in more detail herein.

The primary account management module(s) 240 may also include security management module(s) 250, merchant control module(s) 252, category control module(s) 256, and marketplace control module(s) 258.

The security management module(s) 250 may be configured to manage security levels of the secondary account. The primary user (e.g., the primary account holder) may monitor the security of the secondary account depending upon the maturity level of the secondary user, as discussed herein. Security features of the account management features may be discussed in more detail herein.

The merchant control module(s) 252 may be configured to manage interactions between the secondary account and merchants. In an example, certain merchants may be permitted to transact with the secondary account and/or certain merchants may be prohibited from transacting with the secondary account, per the spending controls table 312. In another example, funds available to be spent may be limited for certain merchants per the spending limits table 314. Other merchant control features may be discussed in more detail herein.

The category control module(s) 256 may be configured to manage interactions between the secondary account and certain categories of goods and services. The category control module(s) 256 may permit the primary account holder to limit spending in certain categories, permit fund transfers for certain categories, and restrict fund transfers for certain categories, such as alcohol or tobacco products.

In an example, the secondary account may be permitted to transact with merchants of certain categories and/or may be prohibited from transacting with merchants of particular categories, per a spending controls table of the tables 300. In another example, funds available to be spent may be limited for certain categories, per a spending limits table of the tables 300. Other category control features may be discussed in more detail herein.

The marketplace control module(s) 258 include controlling where or how the secondary account holder may spend funds from the secondary account (e.g., the spending account). Several examples of where/how funds may be spent are at illustrated at FIG. 13: Debit Card, Shop Online, Send Money, and Mobile Payments. Each of these example means of sending money may be implemented through PAYPAL® features.

Further, the marketplace control module(s) 258 may be configured to manage interactions between the secondary account and certain marketplaces. These marketplaces may have prohibited merchants or categories, for instance. In an example, the marketplace may be a particular website, per the spending controls table of the tables 300. Funds available to be spent may be limited for certain marketplaces, per the spending limits table of the tables 300. Other marketplace control features may be discussed in more detail herein.

A community may limit or restrict interaction between certain merchants, marketplaces, and/or URLs and the secondary users. A community based merchant database may be accessed by the system to evaluate where a purchase amount in a purchase request is acceptable based on the spending restrictions and controls. A secondary account may be set up with a provision for extending the account to other groups, such as a group of parents, a managerial group, a fraternity, a soccer team, or a group with buying power, such as a school, and other communities that collectively collect and spend.

The administration module(s) 130 may include a funds transfer module 230 to control transfer of funds between the savings account and the spending account. In particular, the primary user may set limits on the secondary account user's ability to transfer funds between the savings account and the spending account. See, for example, fund transfer management feature of account management feature described in more detail with reference to FIG. 6.

A funds transfer module(s) 230 may include a verification/approval module(s) 231. The verification/approval module(s) 231 may be configured to verify whether the secondary account may transact given limits placed within the primary account holder management modules 240. Further, the verification/approval module(s) 231 may be configured to permit the primary account holder to approve transactions with the respect to the secondary account holder. The primary account holder may set up a secure channel for authorizing payment to/from the secondary account holder, transactions involving the secondary account holder, communications to/from the secondary account holder, and secondary account viewing. The primary account holder may set up reporting with regard to the secure channel and may set up blocks as discussed herein. Transactions may be subject to verification by the primary account holder based on configured rules. In one configured rule, communications and transactions may be established by viral sign-up, for example, account holders (primary and/or secondary) may invite communication and transactions with third parties. If a third party has not been invited, no communications or transactions with the account holder(s) may be permitted.

Verification and approval module(s) 231 may include analysis of transfers to and from the secondary account, according to parameters set by the primary account holder. Transactions may be approved/disapproved automatically per the monitoring and approval(s) table 316 (saved entries) or they may be approved/disapproved individually, for instance. In instances where the primary account holder set to approve certain or all transactions, the transfer occurs upon such approval. The verification module(s) 231 may communicate with a third party application 138 executing on a third party server 140 to determine if an offer by the third party still exists, if the price of the offer has changed, and/or to determine if the product is in stock, for example. The third party may receive, from the payment module(s) and/or verification module(s): order information, shipment information, and an associated payment and/or payment confirmation. The third party application 138 may receive and process the order, send a virtual receipt to the payment module(s) 132, and forward the order to the client user (either or both the primary and secondary account holders), as set by the primary account holder. For services and/or donations, the third party may receive a requested order and the payment confirmation, exclusive of the user contact information, such as a shipment address. In an additional embodiment, the service provider or charity may receive client user contact information and may send a receipt to the client user. In particular, the verification module(s) may access a database associated with the third party server or associated with the database server(s) 134.

A secondary account holder management module 262 may be configured to enable privacy for transactions associated with the secondary account with respect to the primary account. In one example, the secondary account holder may control what the primary account holder may view concerning the secondary account. For instance, the secondary account holder may transfer in funds from an outside funding source into the account and make a purchase, both of which may be unknown to the primary account holder.

The secondary account may include an independent source portion and a dependent source portion. The dependent source portion of the secondary account may be subject to control by the primary account holder management module and the secondary account holder management module. However, the independent source portion of the secondary account may be subject to control only by the secondary account holder management module.

A source of the independent source portion may include funds earned by the secondary account holder. The secondary account holder management module may be configured to enable privacy for transactions associated with the independent source portion with respect to the primary account holder management module. The secondary account holder management module may be configured to enable privacy for transactions associated with the dependent source portion with respect to the primary account holder management module.

The administration module(s) 130 may include savings module(s) 264, customizing module(s) 266, store module(s) 268, navigation module(s) 270 with a search module 272, reputation module(s) 274, and messaging module(s) 276.

The savings module(s) 264 may include an opportunity for the primary user to allow the secondary user to create savings goals within a savings account. The savings module 264 may be related to the savings account table and the savings goal features, discussed herein. There may be multiple savings goals that may be displayed on an interface, as shown for example in FIG. 6 herein. The savings module(s) 264 may allow automatic payment and/or purchase of savings goals, parental control or limits of savings goals, savings goals related to certain vendors or providers, and dynamic price monitoring of saving goal listings. The savings module may be configured to enable a portion of the savings account to be set aside for a selected goal, as described in more detail herein.

The customizing or personalization module(s) 266 may allow the secondary account holder to customize or personalize the account with various colors or themes, games, budgeting tools, or other various customization tools, as discussed herein. The budgeting tools may allow the secondary account holder to monitor their own spending and to create budgets. The customizing module may include a financial game module to simulate 'real-world' savings and spending. A virtual world financial game module may include a fully-integrated economy architected to reward saving, budgeting and transactions. The game module may include a tracking system of a digital allowance sub-account.

The store module(s) 268 may allow sellers or merchants to group their offers within a virtual store, which may be otherwise personalized by and for the sellers. Such a store may also offer promotions, incentives and features that are specific to and personalized by the respective seller. The device 120, 121, and/or 122 may be used by the client user to search the virtual store of the store module(s) for a product, a service, a promotion, or a donation opportunity. The purchase request for the offer may be made through any of the devices, if permissible per account parameters.

Navigation of the network-based system 112, including through the store module(s), may be facilitated by one or more navigation modules 270. The one or more navigation module(s) may include a search module 272. The navigation module(s) may enable key word searches of products, services, promotions, or donations published via the system 112. A browse module allows users to browse various category (e.g. music, books, offer price, shipping price), catalogue, or inventory data structures according to which products, services, promotions, or donations may be classified within the system 112. Various other navigation modules may be provided to supplement the search and browsing modules.

The reputation modules 274 allow parties that transact utilizing the network-based system 112 to establish, build, and maintain reputations, which may be made available and published to potential trading partners. Consider that where, for example, the network-based system 112 supports person-to-person trading, users may have no history or other reference information whereby the trustworthiness and credibility of potential trading partners may be assessed. The reputation modules 274 allow a user, for example through feedback provided by other transaction partners, to establish a reputation within the network-based system 112 over time. Other potential trading partners may then reference such a reputation for the purposes of assessing credibility and trustworthiness.

The application server(s) 128 may include messaging modules 276. The messaging modules 276 are responsible for the generation and delivery of messages to client users and third parties of the network-based system 112. Such messages, for example, advise client users regarding the status of products (e.g., providing "out of stock" notices to client users). Third parties may be notified of a product order, payment confirmation and/or shipment information. The messaging module(s) 276 may use SMS, IVR, email, or any other appropriate messaging module. Access to the messaging module(s) 276 may be granted, limited or restricted with respect to the secondary account holder as set in parameters defined by the primary account holder. The messaging modules 276 may be associated with a message feature of one of the accounts, such as message feature 1620 of the secondary account interface 1600 of FIG. 16.

The payment module(s) 132 may include a payment transfer module 277, a savings goal purchase module(s) 278, a fraud prevention module(s) 280, and/or dispute resolution module(s) 282.

The payment transfer module 277 may transfer a payment from one of the accounts discussed herein to the third party via the payment module(s) and/or the financial service provider. The payment may be automatically transferred or may be subject to approval and/or verification, as discussed herein.

The savings goal purchase module(s) 278 is related to the savings module(s) of the administration module discussed herein. The savings goal purchase module(s) 278 may include the parameters to purchase, perhaps automatically, the product associated with the savings goal when the goal is met. This on-line layaway may satisfy an impulse to buy a product "now." However, if there is insufficient funds in an account, the item may be selected for automatic payment when there is enough in the account. In this way, the account holder does not have to remember to purchase the item when the account has the funds. Also, having on-line layaway may be a lesson in savings, setting goals, and meeting goals. The merchant associated with the on-line layaway may offer discounts on goals listed in the savings modules and may "lock in" sale prices or offer other sales incentives. Further, the primary account holder may offer discounts on certain purchases to the secondary account holder (by paying the difference between what the secondary account holder pays and the actual sales price) or the primary account holder may provide a fund matching program to promote financial literacy.

The fraud prevention module(s) 280 may implement various fraud detection and prevention mechanisms to reduce the occurrence of fraud within the system 112. The fraud prevention module(s) may prevent fraud with respect to the third party and/or the client user in relation to any part of the request, payment, information flows and/or request fulfillment. Fraud may occur with respect to unauthorized use of financial instruments, non-delivery of goods, and abuse of personal information. The primary account holder and the secondary account holder may have a relationship, such as parent-child. Because the secondary account holder may be a minor, contract law may not be able to be enforced. Potential fraud issues include: the secondary user may purchase something that the parent did not approve of; there may be a separate financial account of the secondary user; originating IP addresses and cookies may not be consistent with previous logins; and blocking of payments from and to secondary accounts. Methods to determine whether fraud has or is occurring include use of IP controls, and analysis of IP addresses and system cookies. The merchant/seller may also block access from these accounts.

The dispute resolution module(s) 282 may provide mechanisms whereby disputes arising between transacting parties may be resolved. For example, the dispute resolution modules 282 may provide guided procedures whereby the parties are guided through a number of steps in an attempt to settle a dispute. In the event that the dispute cannot be settled via the guided procedures, the dispute may be escalated to a mediator or arbitrator.

Figure 3:
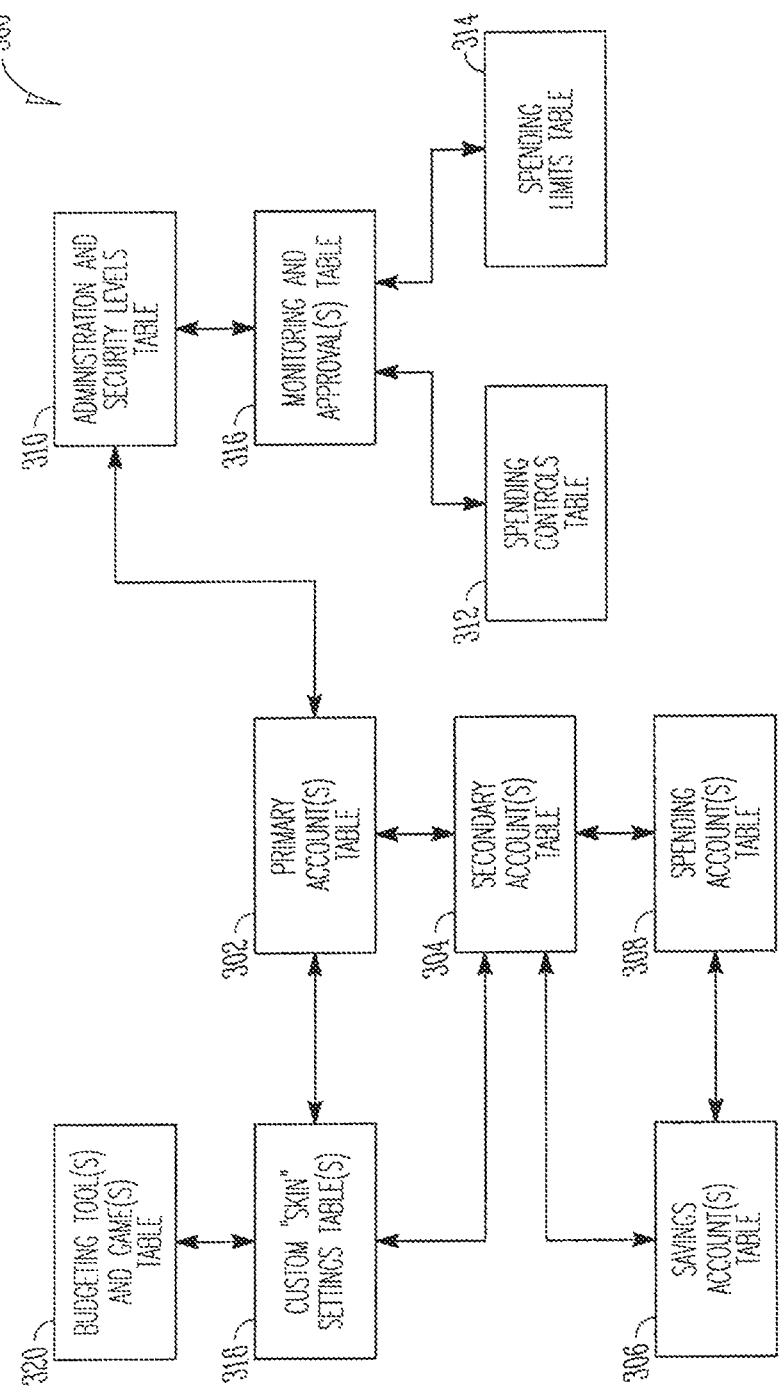
FIG. 3 illustrates a high-level entity-relationship diagram, illustrating various tables that may be maintained within one or more databases, according to an example embodiment.

FIG. 3 illustrates a high-level entity-relationship diagram, illustrating various tables 300 that may be maintained within the databases 136 according to an example embodiment. The tables 300 may be utilized by and support the module(s) of the application server(s).

The tables 300 may include a primary account table 302. The payment module(s) and/or the financial service provider may access the primary account table 302 and/or may utilize the table, 302 through the database server(s) 134. The primary account table 302 may contain a record for each registered primary account holder of the network-based system 112, and may include user identification information, address information (including default address), financial instrument information (including default payment method, currency information), and other information (e.g. wireless carrier) pertaining to each such registered user. A user may, it will be appreciated, operate as a seller, a buyer, a service provider, and/or a service recipient, within the network-based system 112.

The tables 300 may also include a secondary account(s) table 304 having a secondary account that may be linked to one or more primary accounts. Each primary account may also be linked to one or more secondary accounts. Account information, similar to account information for table 302, of the secondary account holder may be kept in the table 304.

Associated with secondary account table 304, may be savings account(s) table 306 and spending account table 308. A record of transactions may be stored in the tables 306 and 308, respectively. The transaction record may include purchase price, the party or user with whom transaction took, date, transaction mechanics, and other transaction related information.

Administration and security levels table 310 may be associated with the primary account holder management modules 240 to administer and secure secondary accounts. The primary account holder may have management and administrative settings stored in the table 310. The administration and security levels table 310 may be used to store information concerning security levels and administration and management of each primary and secondary account. The table 310 may be associated with a monitoring and approvals table 316, which may be associated with the spending controls table 312 and the spending limits table 314 storing account management details as described herein. Further, the security may parallel instant messaging (IM) security measures available.

The secondary account holder may have custom 'skin' settings stored in the custom skin settings table 318. Table 318 may be associated with the customizing modules 266 described herein. Further, budgeting tools and games associated with the secondary account may be stored in a budgeting tools and games table 320. The budgeting tools may help teach financial responsibility and spending discipline to the secondary users.

FIG. 4 illustrates a primary account holder interface 400 according to an example embodiment. The primary account interface includes user identification information, and an ability to edit the profile of the primary user, as well as the status of the primary user. The account type may be personal, business, or another appropriate type as offered by the financial service provider. Account information may be displayed in the interface at 410. Sub-accounts or secondary accounts may also be viewed on this interface at 420. In this instance, there are two secondary accounts, for Tommy Jr. and Samantha. There are at least one spending account and at least one savings account for each secondary account. The secondary accounts may be managed and accessed by selecting a link associated with the secondary account, for example. Messages associated with the secondary account(s) and transactions associated with the secondary account(s) may be approved through use of this interface. An account linking feature 430 to create a new linked account, to link a secondary account to a primary account, the secondary account may include both a spending account and a savings account.

Figure 6:
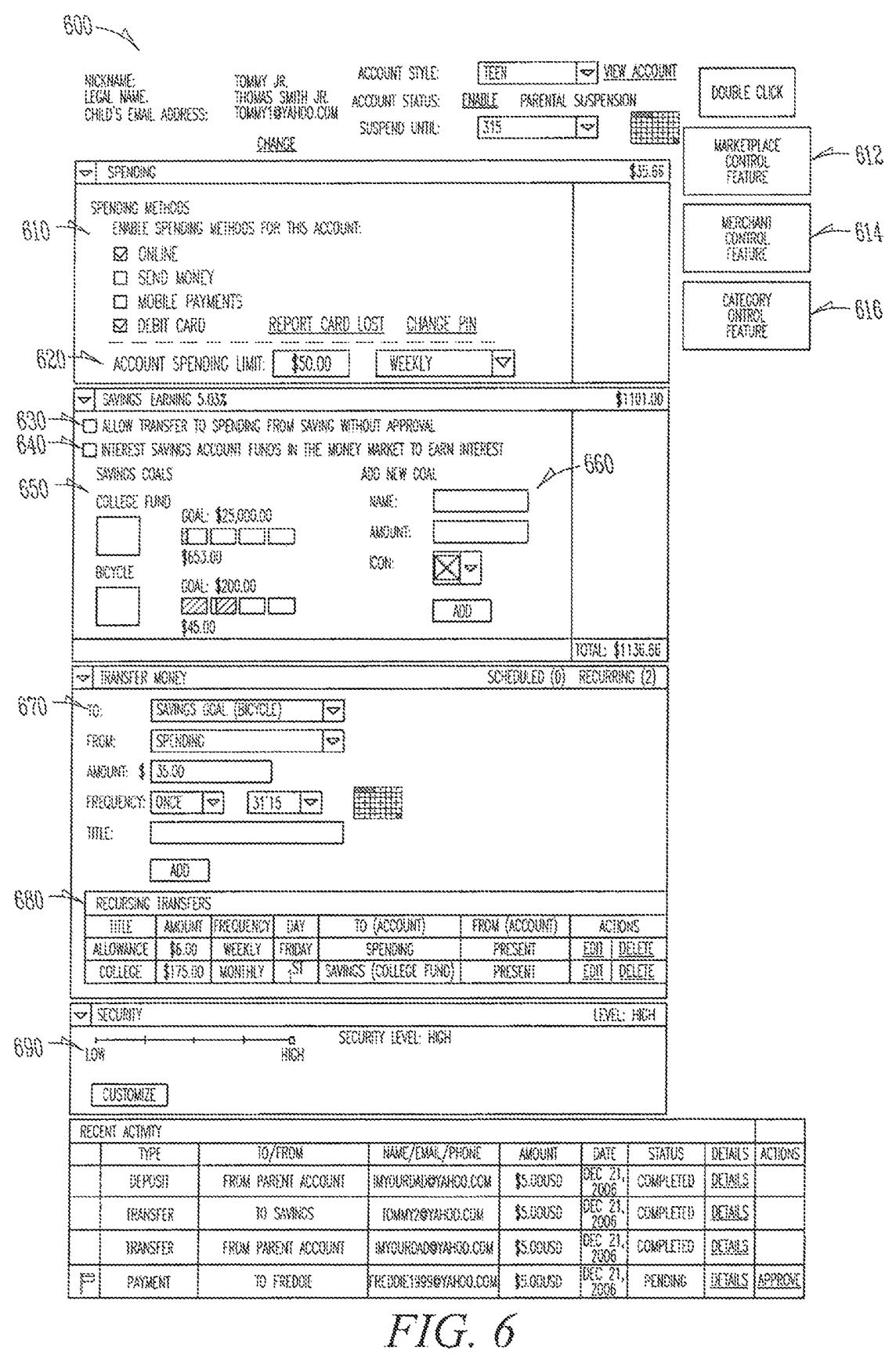

FIGS. 5 and 6 illustrate a management interface 500 and 600 according to an example embodiment. The primary account holder may manage the secondary account using this interface 500 and 600. FIG. 5 illustrates the interface in a condensed format, while FIG. 6 illustrates the interface in an open format.

On the interface 600, there may be account management features to facilitate automatic payments or transfers, facilitate requests for money to be made without approval, adding funds, withdrawing funds, disabling spending accounts, disabling login accounts, disabling for a certain time period (e.g., grounded for a week), allowing transfers between savings and spending, funds amount limit on transfers for a certain duration, enabling spending methods (e.g., online merchant, sending funds to another email account, mobile payments, debit card, virtual debit card), funds amount limit on spending for a duration, allowing investment of savings account funds in higher interest money market account, adding savings goals, and deleting savings goals.

Spending account totals and information of the secondary account may be displayed at spending control limit tab 510. Another account management feature is spending methods selection feature 610 when tab 510 is opened up. Spending methods at account management feature spending methods selection feature 610. When opened up in FIG. 6, the spending methods selection feature 610 may include spending methods of: online, send money, mobile payments and debit card. Management of the debit card may also be accessed at spending methods selection feature 610.

Spending tab 510 may include several account management features including marketplace control feature 612, merchant control feature 614 and category control feature 616. There may be several spending limits associated with different time periods, for example at account management feature: spending limit feature 620.

Savings account totals and information of the secondary account may be displayed at savings control limits tab 520. When opened up in FIG. 6, the Savings tab 520 may include several account management features including a fund transfer feature 630, an interest savings account feature 640, a savings goal feature 650, and a 'add' savings goal feature 660. The fund transfer feature 630 may allow transfers from the savings account of the secondary account to the spending account of the secondary account.

The interest savings account feature 640 may allow funds in the secondary account savings account to earn interest. The primary account holder may subsidize this interest earned or may offer an opportunity for the secondary user (holder of the secondary account) to earn interest in an account of the primary user (e.g., a money market account). The interest earned in the savings secondary account may be at a different rate or a higher rate than the primary account, if the primary account subsidizes the interest accrued.

A system of exchange and borrowing may incorporate one financial instrument across multiple accounts. The secondary account holder may spend from the primary account with certain restrictions. In one embodiment, funds from multiple accounts may be combined into a single (primary) account. This fund combination may allow a merchant's or third party's interface to be designed to accommodate a single account. The combination of funds may be handled by a secondary server of the application server(s) 128 associated with the secondary account(s) rather than a primary server of the application server(s) 128 associated with the primary account. The secondary server may manage the transfer of funds from the secondary account(s) into the primary account. Account number and any other relevant information for the account(s) may then be forwarded to the primary server. The payment accounts of one account type (for example, a savings secondary account) may be converted to another account type (for example, the primary account) by the secondary server. This conversion may be transparent to both an account holder and a merchant from whom the account holder may be making a purchase. The system may authorize a transaction (e.g., purchase from the merchant) and may debit the primary account according to a defined set of rules, such as reimbursing the primary account from the secondary account(s). Within this described system, the secondary account(s) may be subject to the same interest-bearing benefits as those attributed to the primary account.

The savings goal feature 650 may be associated with the savings module 264 as describe herein. The 'add' savings goal feature 660 may be a feature to add additional savings goals.

When opened up in FIG. 6, the transfer money tab 530 may include account management features: a fund transfer feature 670 and a recurring transfers table 680. The fund transfer feature 670 may permit the primary account holder to transfer money between their account and the secondary account(s), and may permit transfer of funds between the spending and savings accounts. The primary user may set parameters on funds transfer such that approval of the primary user is met before transfer of funds into and out of any of the secondary accounts. The recurring transfers table 680 lists transfers recurring with respect to the secondary account.

When opened up in FIG. 6, the security tab 540 may include another account management feature: a security selection feature 690. The security selection feature 690 may include a sliding scale from low to high representing the levels of security specified for the current secondary account. For example, for high security levels, each transaction is to be approved by the primary account holder before completion. Higher security levels may be recommended for younger children, for instance. The security levels may restrict paying for items on web sites that are in age sensitive categories or as not labeled as trusted merchants. Money transactions, received and sent, as well as messages, may be subject to approval with the highest security levels. With lower security levels, there may be some limits in certain features, or no limits in certain features. The security features may be customized. For example, certain categories may be turned off for purchases, e.g., alcohol and tobacco.

The recent activity tab 550 may include a list of types of activities, to and from information for each activity, names or contact information for each activity, amount, date, status (completed, pending, etc.), transaction details, and actions (such as pending approvals). The primary user may request or view statements or reports as to secondary account activity.

The interface 500 may include several account management features including an account style feature tab 560, a suspension feature 570, and a period of suspension feature 580. The account style feature tab 560 may be related to the security levels that may be automatically set per account style. Security levels may also be individually adjusted. Account styles may include business, personal, and dependents, such as teens and youth. For example, there may be a college or graduate account (about age 17 and older), a teen account (about age 13 and older), a tween account (about age 8 and older), and a toddler account (about age 4 and older). The primary account holder may select the account style based on the relationship, the maturity, and/or the age of the secondary account holder.

As also shown in FIG. 6, the primary account holder may suspend or enable the account status of the secondary account at the suspension feature 570. A "suspend until" date may also be selected by the primary account holder in the event that the suspension is not indefinite, using the period of suspension feature 580. Access to the interface for instance, may be limited with respect to the secondary account holder when the account is suspended.

The primary account holder, e.g., the comptroller, the accounting department, a parent or a supervisor, may gain a "peace of mind" knowing that they have controls over the what, when, who and how specifications related to the secondary accounts.

Figure 7:

FIG. 7 illustrates a primary account holder interface 700 according to another example embodiment. The interface 700 facilitates management of a secondary account 710. Spending account information is displayed at 720 in this example. The spending account information 720 may include account balance, the transfer funds feature 726 and the setting limits feature 724. The savings account information 730 may include interest information 735, account balance, savings goal features 738, and assorted account management features, such as those described with reference to FIGS. 5 and 6.

The account management feature of transfer fund feature is depicted in this interface 700 at 745. The activity tables are broken up into money spent/spending section 750 and money receiving section 760. In the money receiving section, there may be at least one transaction pending approval at 770, as discussed in more detail herein.

Figure 8:
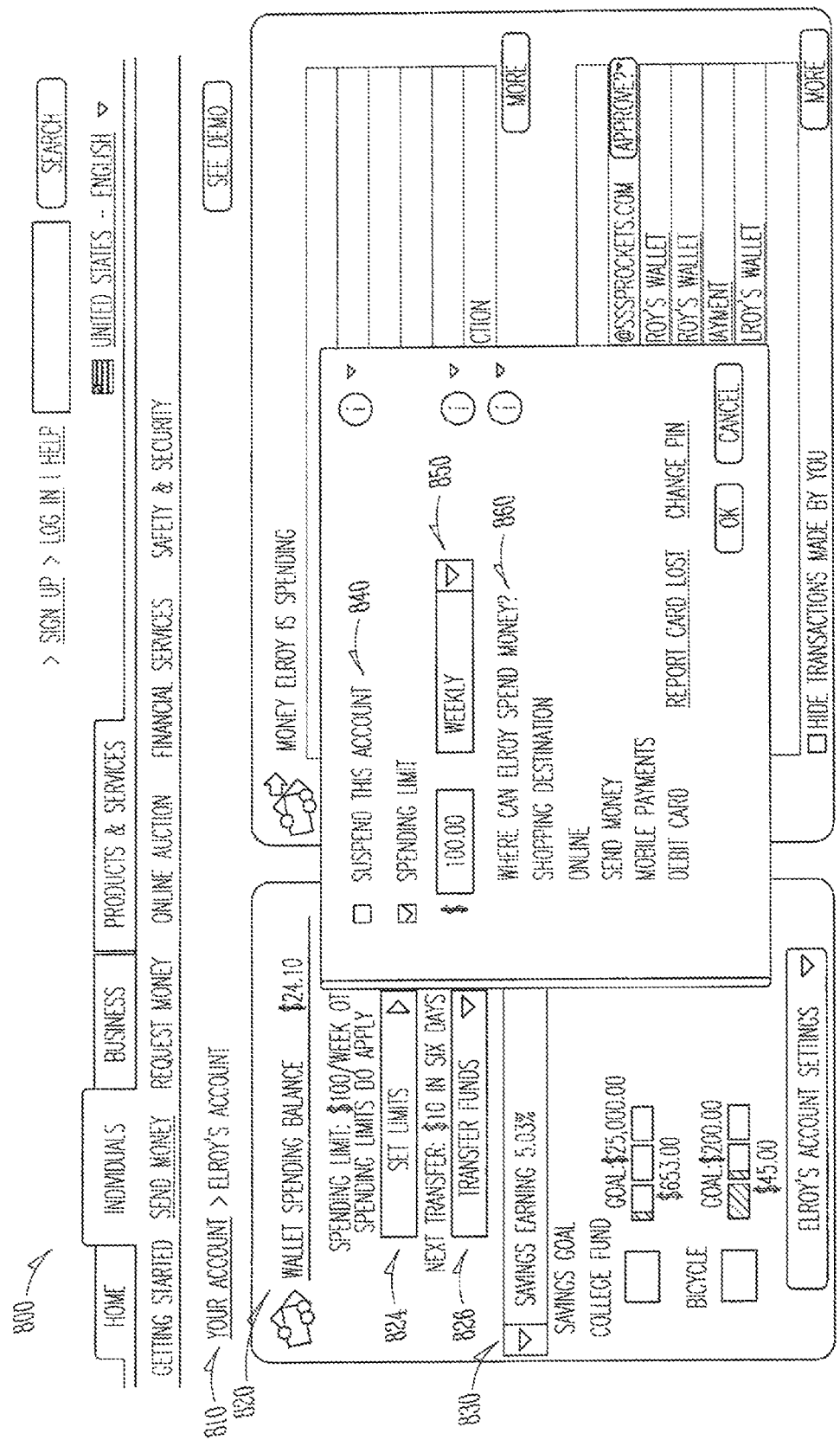

FIG. 8 illustrates a primary account holder interface 800 according to another example embodiment. The interface 800 facilitates management of a secondary account 810. Spending account information is displayed at 820 in this example. The spending account information 820 may include account balance, the setting limits feature 824 and the transfer funds feature 826. The savings account information 830 may be included in the interface 800 as well. When the primary account holder selects the setting limits feature 824, a window opens that offers several account management features. The account management features of setting limits feature 824 includes management of account suspension 840, management of spending limits 850, and management of shopping destinations 860 for the secondary account.

Figure 9:
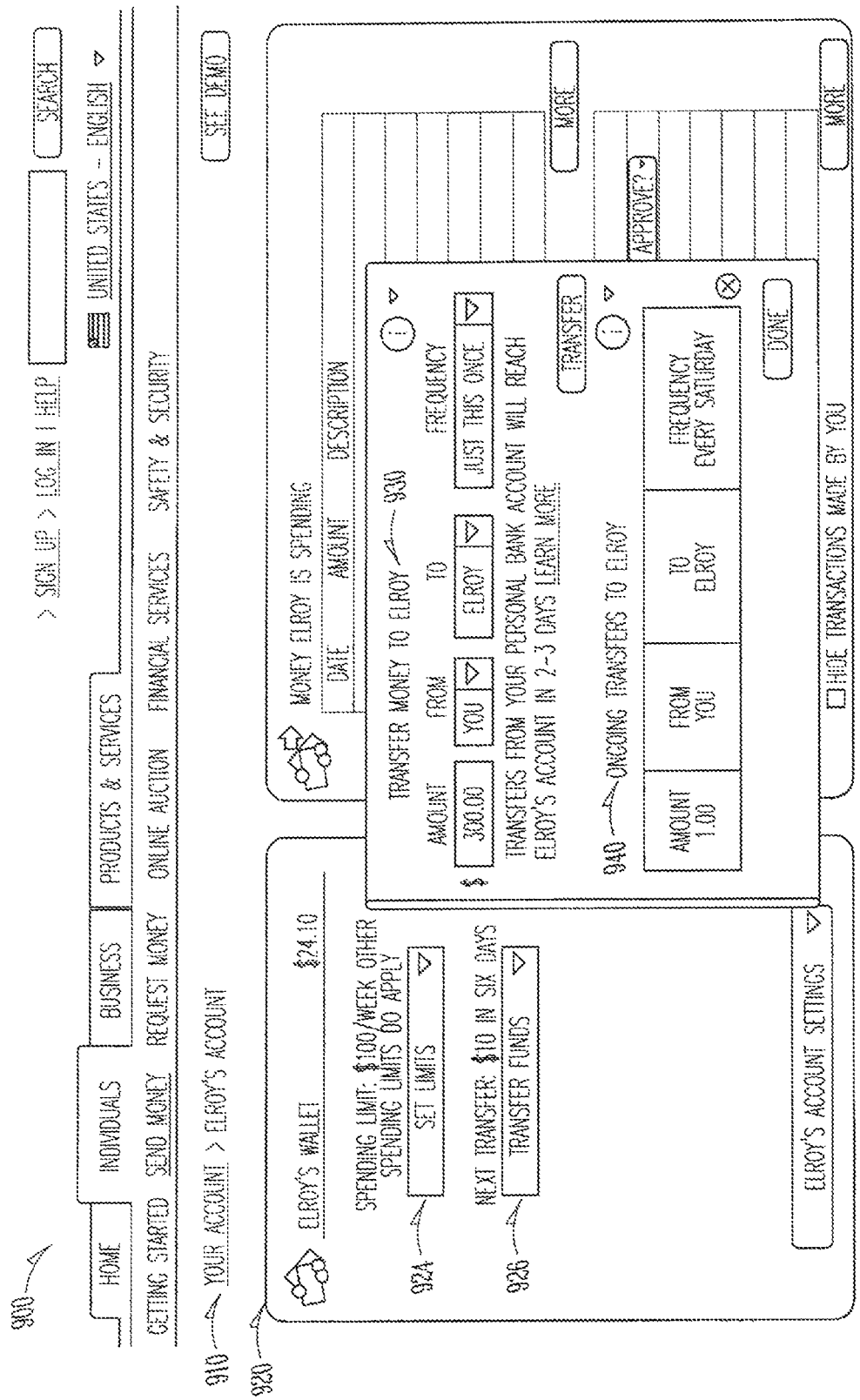

FIG. 9 illustrates a primary account holder interface 900 according to another example embodiment. The interface 900 facilitates management of a secondary account 910. Spending account information is displayed at 920 in this example. The spending account information 920 may include an account balance, the setting limits feature 924 and the transfer funds feature 926. The savings account information may not be shown in this interface. When the primary account holder selects the transfer funds feature 926, a window opens that offers several account management features. The account management features of transfer funds feature 926 includes management of funds transferred to the secondary account 930 and management of recurring transfers to the secondary account 940.

Figure 10:
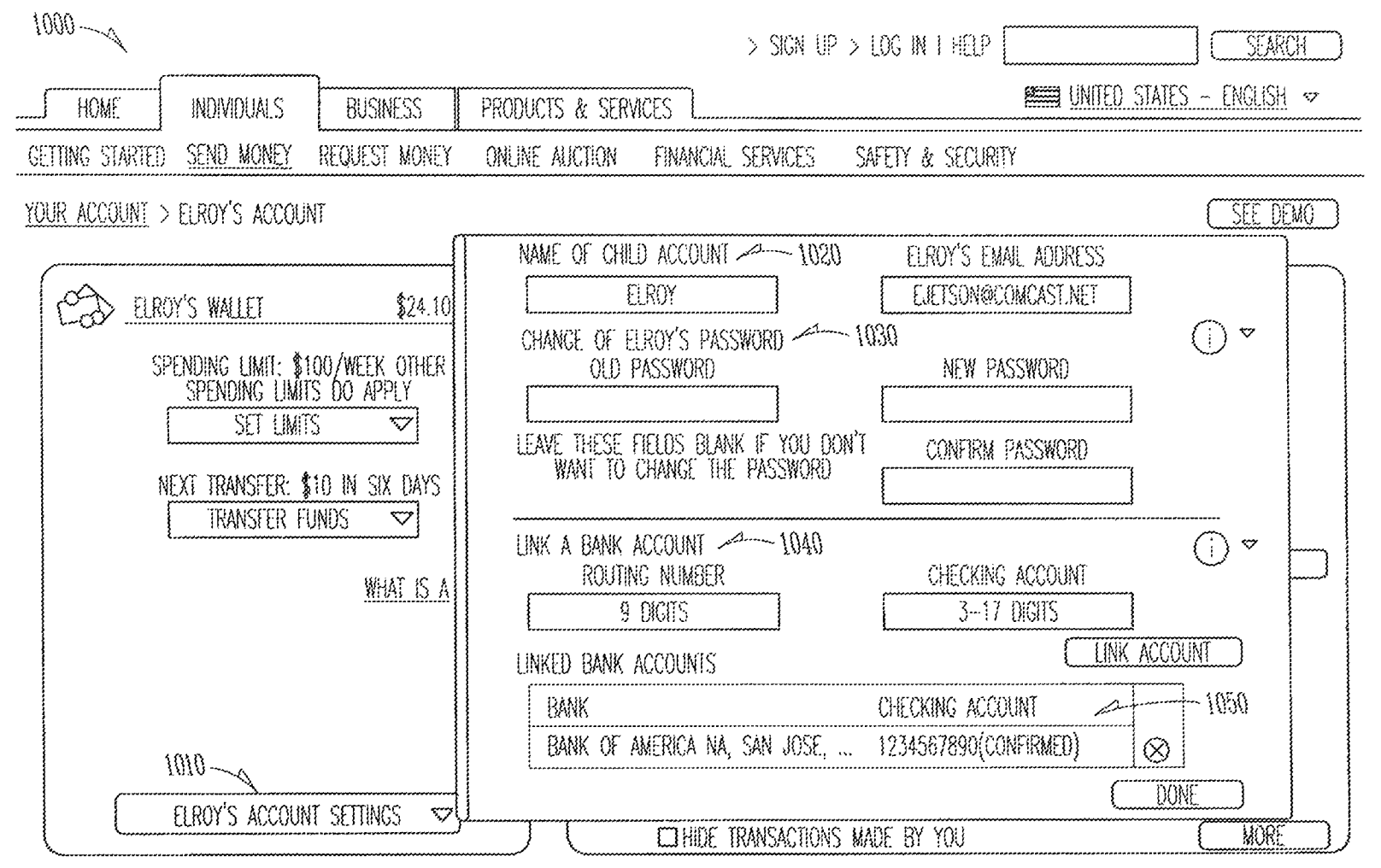

FIG. 10 illustrates a primary account holder interface 1000 according to another example embodiment. The interface 1000 facilitates management of a secondary account. When the primary account holder selects the account management feature, a secondary account settings feature 1010, a window opens that offers several account management features, including secondary account holder name and contact information 1020, secondary account holder's bank account information 1040 to link to the secondary account, and bank account information 1050 already linked to the secondary account.

Figure 11:
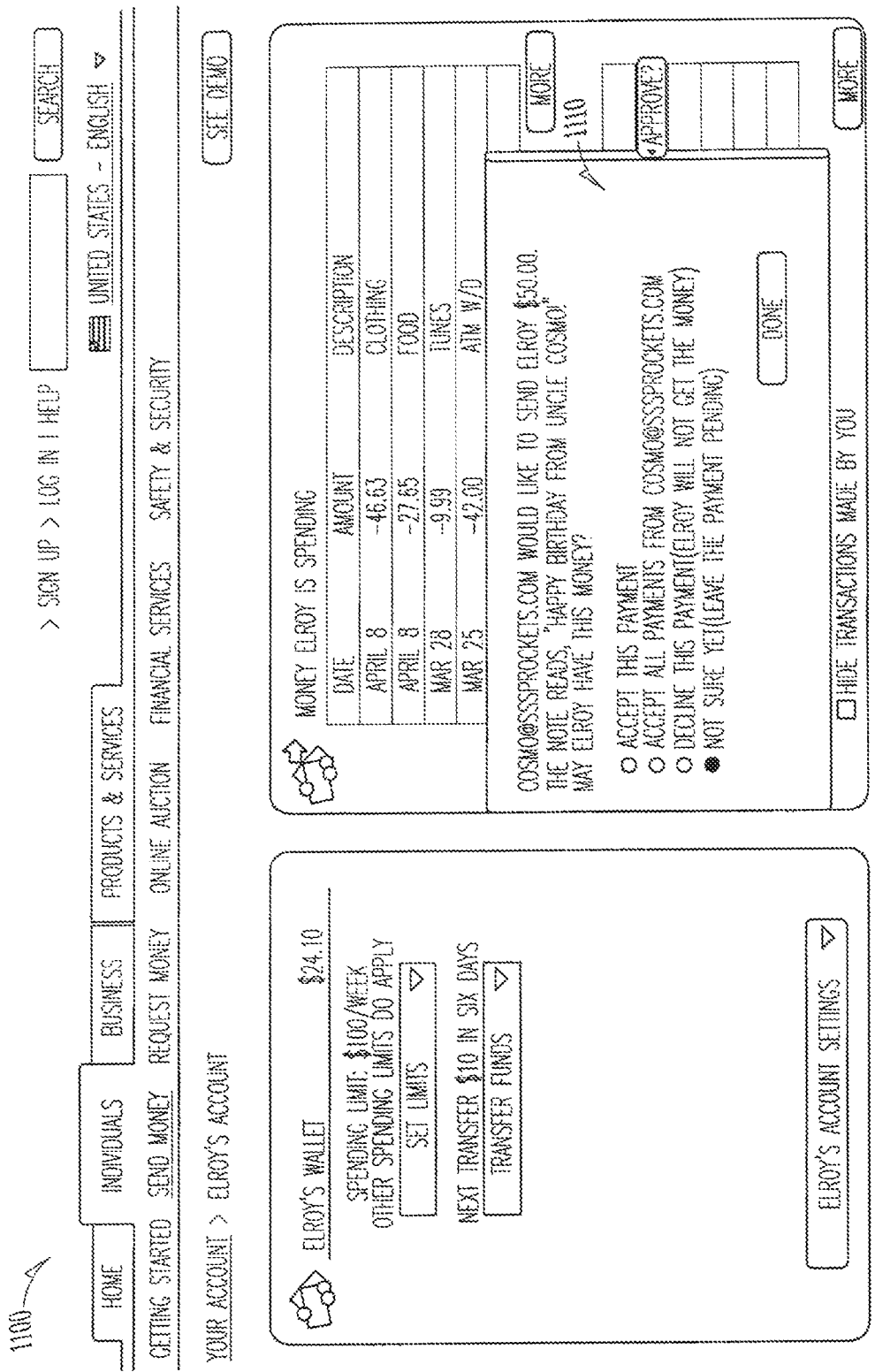

FIG. 11 illustrates a primary account holder interface 1100 according to another example embodiment. The interface 1100 facilitates management of a secondary account. When the primary account holder selects the "Approve?" feature, a window or feature may open that offers several account management features, including a transaction approval feature 1110. The transaction approval feature may offer the primary account holder the following options: accept this payment (current transaction), accept all payments from this source (current and future transactions), decline this payment or not sure yet (i.e., do nothing or hold the transaction until transaction approval is granted or denied). The transaction approval feature may include an option for the primary account holder to pre-approve select transactions from a group including selected marketplaces, selected merchants, selected categories, and selected fund transfer amounts.

Figure 12:
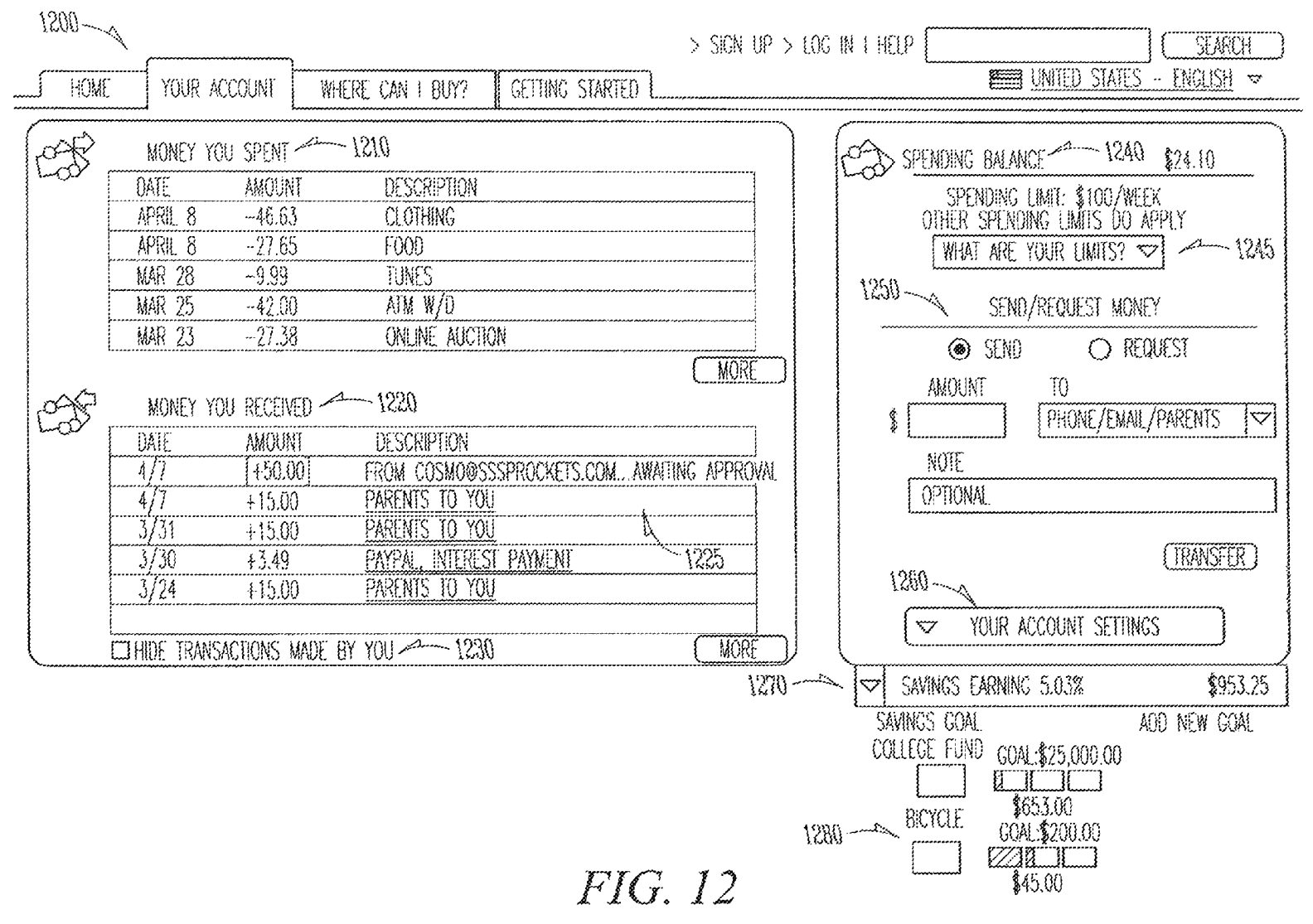

FIG. 12 illustrates an interface 1200 according to an example embodiment. Interface 1200 shows the secondary account holder user interface 1200 to administer the secondary account(s). A spending table 1210 displays where secondary account funds have been spent and may include the date associated with a particular transaction, the amount of the transaction and the transaction description, including category, marketplace, and/or merchant. A deposit table 1220 displays where secondary account funds have originated and may include date, amount, and description. If any transactions are pending approval from the primary account holder, they may be indicated in their respective table. In this example, a pending deposit 1225 is awaiting approval. Transactions between the primary account and the secondary account(s) may be hidden at feature 1260.

Figure 13:
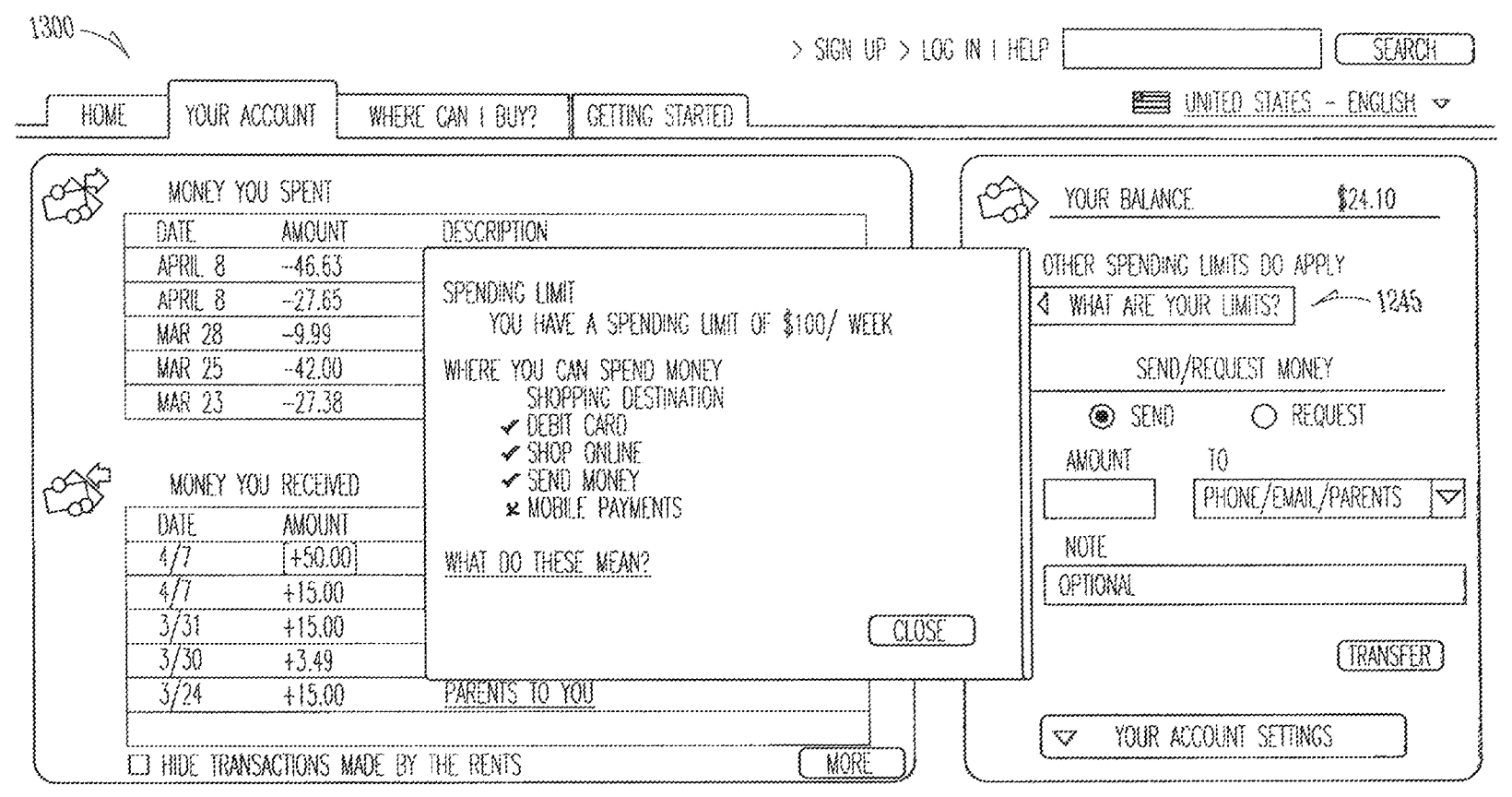
Figure 14:
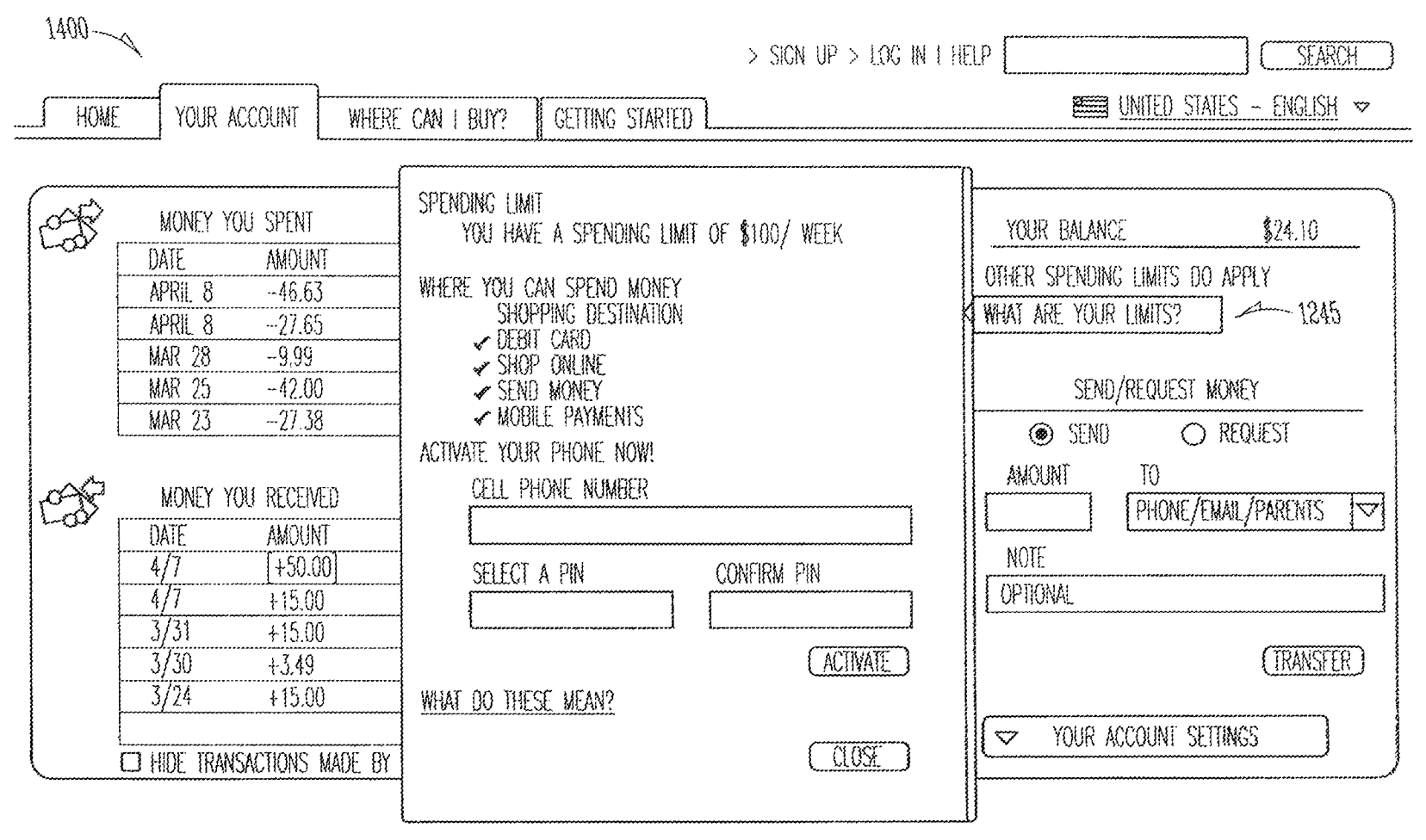

Spending account information 1240 may include account balance, the spending limits, and a limits feature tab 1245. FIGS. 13 and 14 illustrates a window that may open upon selection of the limits feature tab 1245. The spending limits may be listed for the secondary account holder to view. Further, in an embodiment not shown, the spending account information 1240 may indicate available spending balance (e.g., $15 remaining of the maximum spending limit $100 this week). Shopping destinations or possible methods to use for spending secondary account funds may be listed for the secondary account holder to view. Online shopping may or may not be enabled for the secondary account holder, again, depending upon parameters defined by the primary account holder. To make mobile payments, for instance, the mobile phone may be activated in this window by entering a phone number and a pin in the instance where mobile payments is an option provided by the primary account holder.

Figure 15:
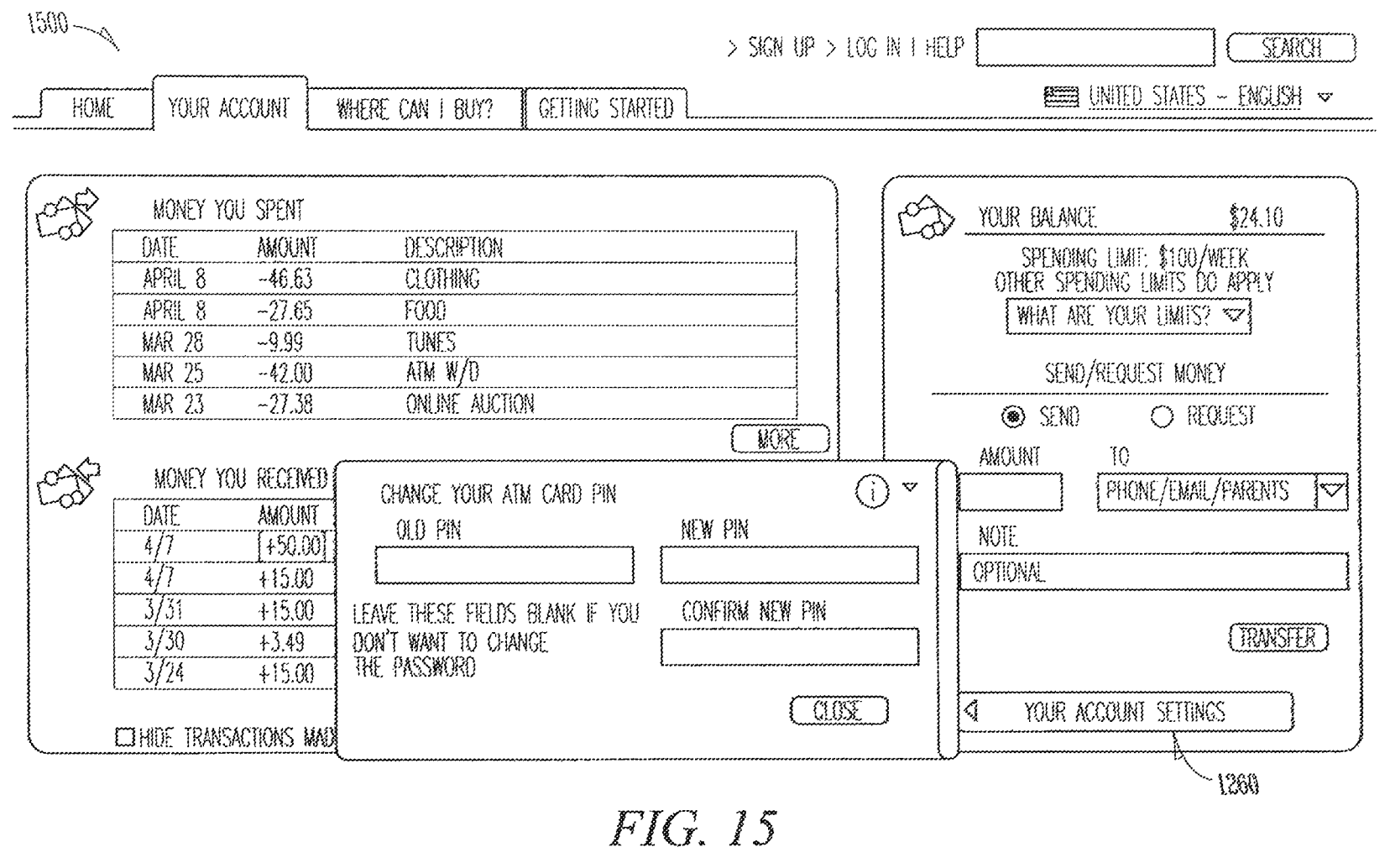

Requests for funds or to send funds may be made through a fund request feature 1250 in the interface 1200 of FIG. 12. These fund requests may be subject to approval by the primary account holder in certain account types. The secondary account holder may send money to and request money from selected recipients or email addresses (as designated by the primary account holder). An account settings feature 1230 may also be included in the interface 1200. FIG. 15 illustrates a window that may open upon selection of the account settings feature 1230. The account settings feature 1230 may include ATM card pin management, for example. Savings account information 1270 may include account balance, savings interest rate, and savings goals feature 1280.

Figure 16:
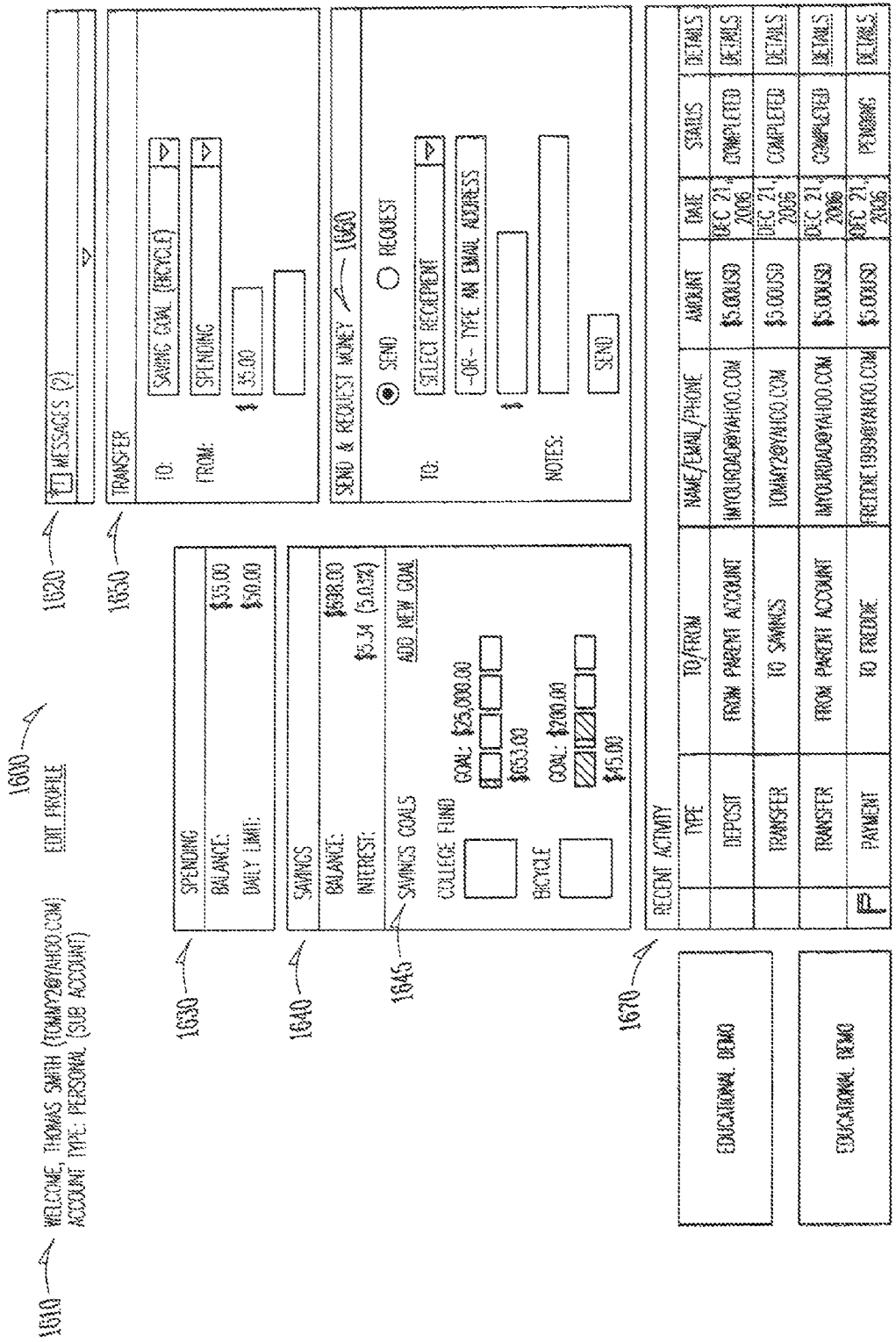
Figure 17:
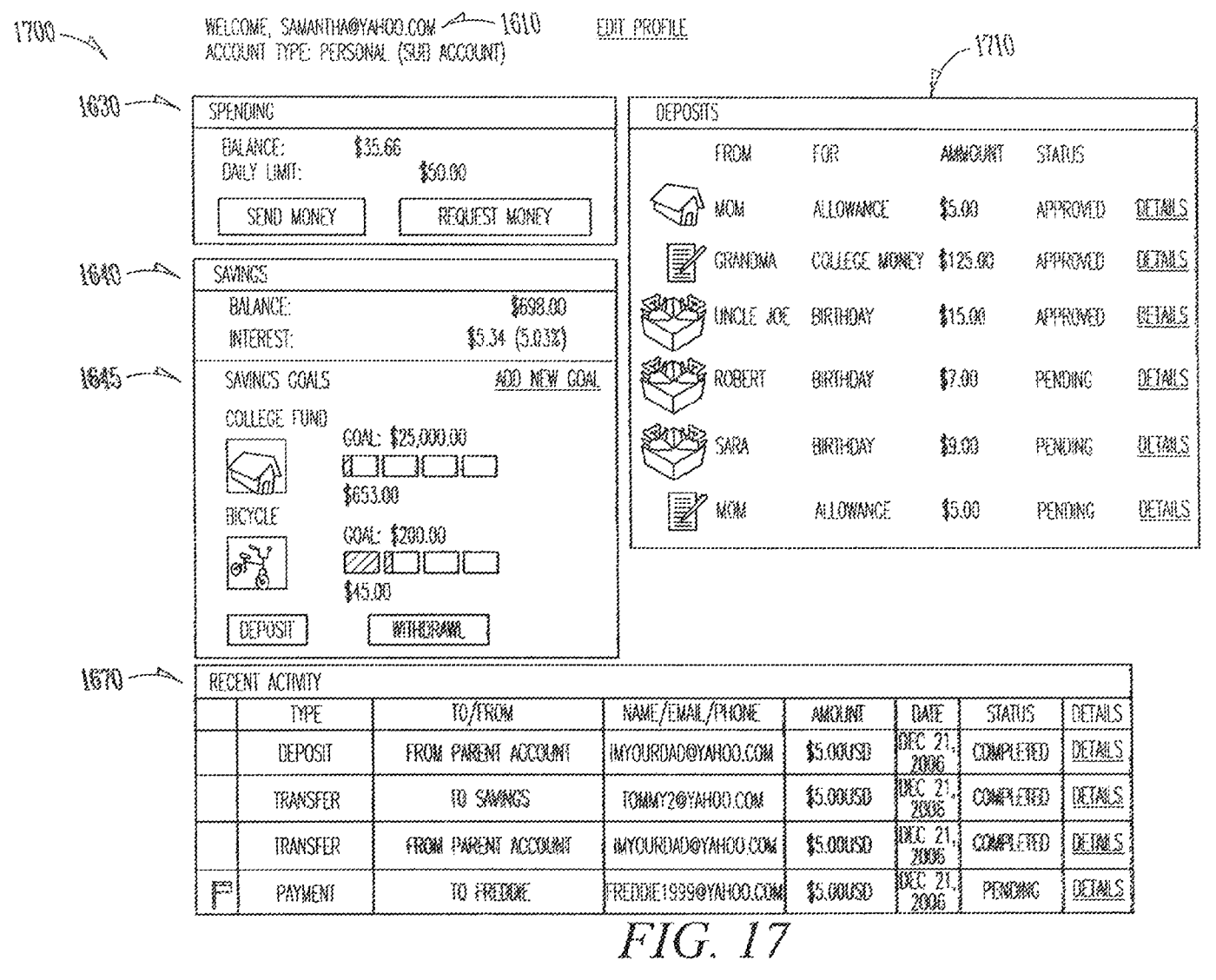

FIGS. 16 and 17 illustrate secondary account holder user interfaces 1600 and 1700 according to example embodiments. The interfaces 1600 and 1700 may include a secondary account holder user information 1610. The secondary account holder user information may be editable. A message feature 1620 may also be part of the interlaces. A spending table 1630 displays a spending balance and spending limits. Amount available, per spending limits, may also be displayed in some embodiments. A savings table 1640 displays account balance, interest (if any), and savings goals features 1645. Balances and limits associated with each sub-account (savings and spending) may be displayed. Savings goals may be shown with appropriate icons (diploma for college, car, bicycle, MP3 player, or other goal). The goal amount, and current percentage met may be posted and/or illustrated graphically. Each savings goal may be edited, e.g., for automatic purchase. New goals may be added, and goals may be deleted. Each savings goals may be added to automatically upon receipt of funds into the secondary account. For example, upon receipt of $100 into the secondary account, 10% may be automatically deposited into a charity fund, 25% may be automatically deposited into the spending account, 5% may be deposited into each savings goal, $10 may be transferred to a car insurance payment and the rest may be deposited to savings. The secondary account holder may have access to set the percentages and dollar amounts automatically transferred to the respective accounts. In another embodiment, the primary account holder may set guidelines within which the secondary account holder may budget (e.g., 0% to 25% may be deposited into the spending account).

In the instance where the primary account holder has set an appropriate security level for the secondary account, the secondary account holder may transfer funds between the secondary sub-accounts at transfer funds feature 1650. The secondary account holder may send funds, and/or request funds at the funds request feature 1660. The secondary account holder may need to fill out the recipient or an email address as well as amount and any notes describing the transaction. The transaction may be subject to approval by the primary account holder. A table 1670 lists recent transaction activity, as described herein. The interface 1700 may be for a young secondary account holder with fewer options for selection than interface 1600. Amount of Transaction Information, icons and graphics may be more basic, more colorful and/or playful, such as a piggy bank to represent amount in savings. A deposit table 1710 with icons representing each source may also be displayed in the interface 1700.

Figure 18:
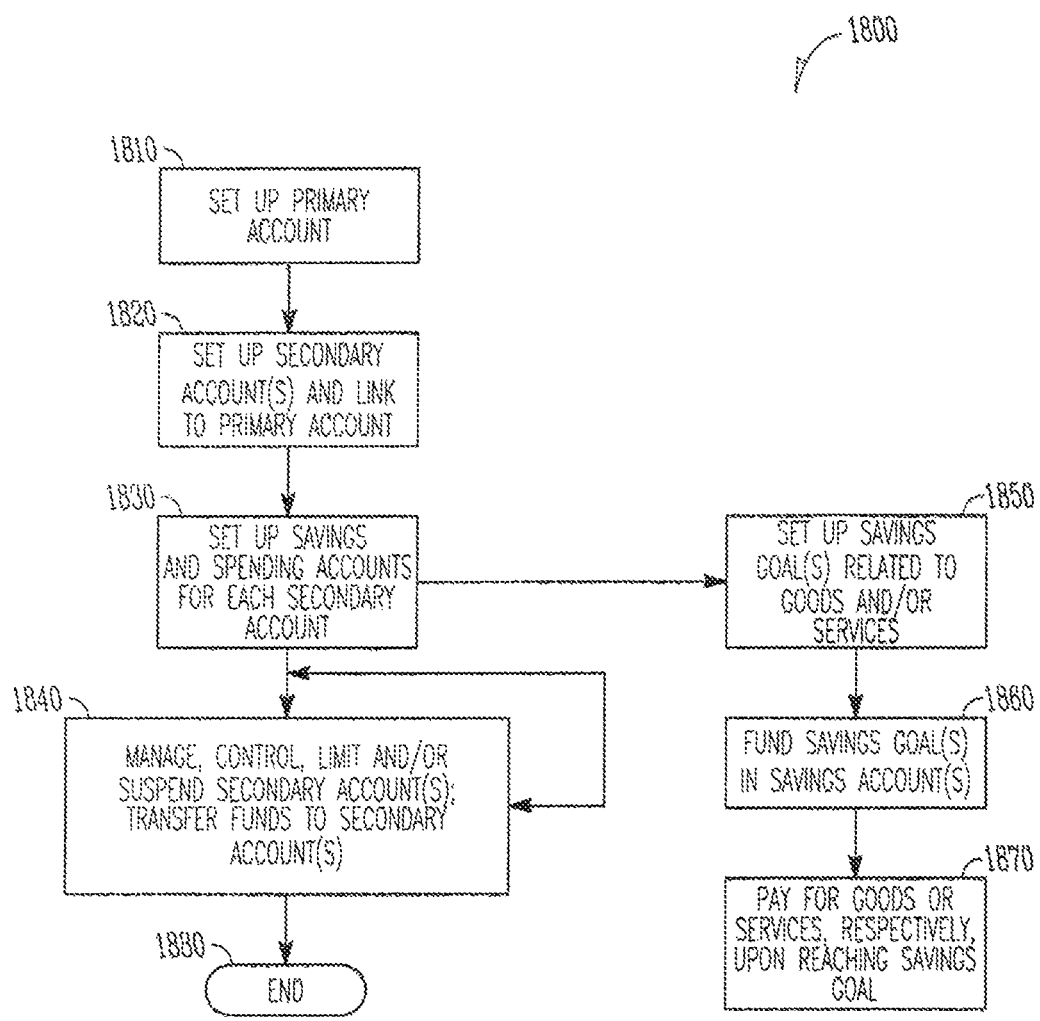
FIG. 18 illustrates a flow chart of a method, according to an example embodiment of the present invention.

FIG. 18 illustrates a flow chart of a method 1800, according to an example embodiment of the present invention.

At block 1810, a primary account is set up using the account set up module 260. The primary account record is established in the primary account table 302.

At block 1820, a secondary account is set up using the account set up module 260. The primary account record is established in the primary account table 304. The secondary account may be set up by the holder of the primary account and may be linked to the secondary account. The primary account may have an account administration module to administer the primary and secondary accounts.

At block 1830, a savings account and a spending account may be set up for each secondary account using the account set up module 260. The savings account record is established in the savings account table 306. The spending account record is established in the spending account table 308.

The flow chart 1800 may proceed to account management at 1840 and/or may proceed to savings goals at 1850.

At block 1840, spending control, spending limits, and other administrative controls may be set up with respect to the secondary account by the primary account holder. The secondary account may be managed, controlled, limited and/or suspended as described herein. The controls and limits may be dynamic, changing as per the primary account holder. Administrative controls record is established in the administration and security levels table 310. Monitoring and approval(s) records are established in the monitoring and approval(s) table 316. Spending control record is established in the spending control table 312. Spending limits record is established in the spending limit table 314.

The primary account holder may have the account automatically change over time or may actively change the control and limits, e.g., in the instance where the secondary account holder is a "grounded" dependent of the primary account holder, the account may be suspended.

The secondary user may become a primary user upon relinquishing of controls and limits by the primary user. The controls and limits may be relinquished in a graduated track, gradually relinquishing controls and limits in a step by step fashion as time, trust, and maturity levels of the secondary account holder increase. The graduated track may correspond to the security levels designated by the primary account holder for the secondary account. The security levels may decrease from a higher to a lower level or may increase to a higher level, for instance, if there is an instance of friendly fraud or secondary account suspension. The security levels may automatically adjust, may be preset by the primary account holder to adjust if certain prerequisites are met, or may be manually adjusted. The secondary user then may establish the primary account with the financial service provider. The primary accounts of the primary user and secondary user may be linked in the system 112, which may provide some accessibility convenience. For example, when dependents leave for college, more financial responsibility may be appropriate for parents to render. The dependent may alternatively migrate to a type of credit card, a Campus card, or another age appropriate fund access model, for instance.

In an instance where the secondary user earns money, at a job, for instance, the money may be in the same secondary account, may be in an account linked to the secondary account, or may be in the secondary account, but partitioned similar to how the savings and spending accounts are now partitioned, with primary-controlled ability to transfer between the sub-accounts. The financial service provider may have some privacy controls to allow the secondary user to block or limit access to the self-earned account from the primary user.

Funds may be transferred to the secondary account. The funds may be a result of an allowance or an automatic transfer from the primary account, as a one time occurrence, or on a periodic basis, as determined by the primary user. In response to a primary account holder management module of the account administration module, the funds transfer module may be configured control and/or limit funds transfer to the secondary account from an outside source.

At block 1850, the secondary account holder and/or the primary account holder may set up a savings goal related to purchase of goods or services, or another goal, such as a college fund.

At block 1860, the savings goal(s) may be funded in the savings account(s) of the secondary account holder.

At block 1870, upon reaching the savings goal, the goods or services may be paid for. The goods or services may be automatically paid for, for example, in the instance where the primary account holder has allowed such parameters on the account. In a further embodiment, the user may be prompted for authorization to pay for the goods or services, upon reaching the savings goal. In this embodiment, the payment is only made upon receiving appropriate authorization from the user.

The financial service provider and/or the payment module may debit a system account of the client user (in this case, the secondary account holder) and credit a system account of the seller or third party. In addition, the financial service provider and/or the payment module may charge the client user's credit cards, automatically withdraw funds from a bank account of the client user, or automatically withdraw funds from credit instruments associated with the FSP (e.g. including the PAYPAL® Buyer Credit technology). The financial service provider and/or the payment module may pay the third party and/or vendor by depositing funds into a system account or a bank account of the third party. In additional embodiments, the payments may be peer-to-peer, business-to-business, and/or consumer-to-business. The financial service provider may charge a transaction fee and/or a surcharge fee. The transaction and/or surcharge fee may be included in the price shown to the client user or buyer. The payment transferred from the client user may include the payment sent to the third party and the transaction/surcharge fee assessed by the financial service provider. Order information and payment confirmation may be sent to the third party. The order information may include shipment information.

The third party may optionally process the order, and optionally ship (or otherwise provide) the product, service, of donation, if applicable. The product and/or receipt may be physically received at the default address destination of the client user. Additionally or alternatively, the client user may receive an electronic confirmation, such as a receipt or a voucher for a service or donation, via-e-mail, web page update, device application update, a voicemail message, a text message, and/or a telephone message. The shipment/receipt may alternatively or additionally be sent by the application server(s). For example, the shipment may include a message sent to the network-based device, such as a link to download an application that is ordered by the client user, a message including a code to access a service that is ordered, or a message including ordered information, such as stock purchase information. In an embodiment where a donation is made, there may be no shipment and there may be a receipt sent to the user.

Figure 19:
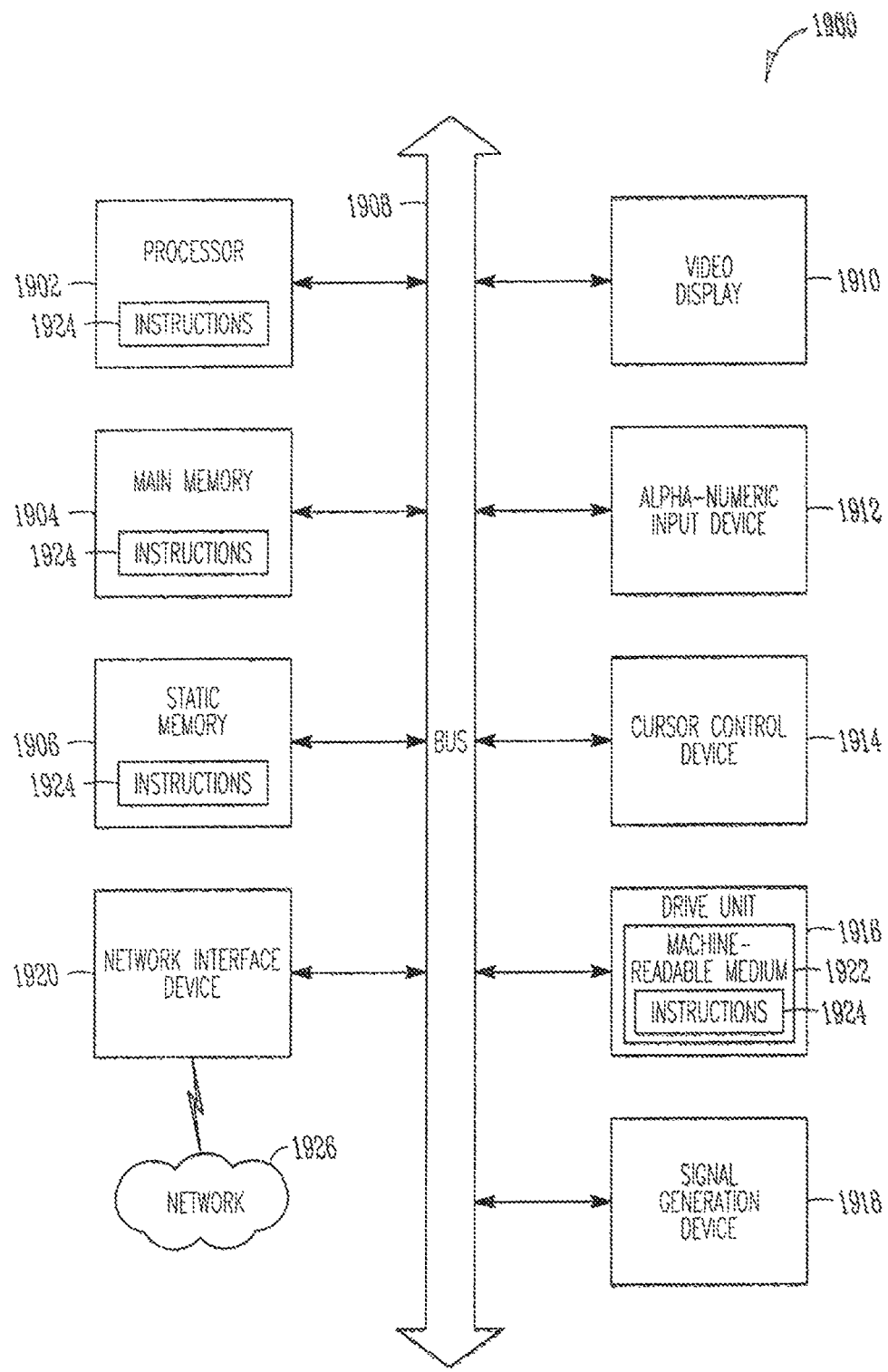
FIG. 19 illustrates a diagrammatic representation of a machine in the form of a computer system within which a set of instructions, for causing the machine to perform any one or more of the methodologies discussed herein, may be executed, according to an example embodiment.

FIG. 19 shows a diagrammatic representation of a machine in the example form of a computer system 1900 within which a set of instructions, for causing the machine to perform any one or more of the methodologies discussed herein, may be executed. In alternative embodiments, the machine operates as a standalone device or may be connected (e.g., network) to other machines. In a network deployment, the machine may operate in the capacity of a server or a client user machine in server-client user network environment, or as a peer machine in a peer-to-peer (or distributed) network environment. The machine may be a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a television, television cable a pager, a personal trusted device, a web appliance, a network router, switch or bridge, or any machine capable of executing a set of instructions (sequential or otherwise) that specify actions to be taken by that machine.

Further, while a single machine is illustrated, the term "machine" shall also be taken to include any collection of machines that individually or jointly execute a set (or multiple sets) of instructions to perform any one or more of the methodologies discussed herein.

The example computer system 1900 includes a processor 1902 (e.g., a central processing unit (CPU), a graphics processing unit (GPU), or both), a main memory 1904 and a static memory 1906, which communicate with each other via a bus 1908. The computer system 1900 may further include a video display unit 1910 (e.g., a liquid crystal display (LCD) or a cathode ray tube (CRT)). The computer system 1900 also includes an input device 1912 (e.g., a keyboard), a cursor control device 1914 (e.g., a mouse), a disk drive unit 1916, a signal generation device 1918 (e.g., a speaker) and a network interface device 1920.

The disk drive unit 1916 includes a machine-readable medium 1922 on which is stored one or more sets of instructions (e.g., software 1924) embodying any one or more of the methodologies or functions described herein. The instructions 1924 may also reside, completely or at least partially, within the main memory 1904, the static memory 1906, and/or within the processor 1902 during execution thereof by the computer system 1900. The main memory 1904 and the processor 1902 also may constitute machine-readable media.

The instructions 1924 may further be transmitted or received over a network 1926 via the network interface device 1920.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations. In example embodiments, a computer system (e.g., a standalone, client or server computer system) configured by an application may constitute a "module" that is configured and operates to perform certain operations as described herein below. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein.

While the machine-readable medium 1922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, or optical and magnetic media.

As noted, the software 192 may be transmitted over a network using a transmission medium. The term "transmission medium" shall be taken to include any medium that is capable of storing, encoding or carrying instructions for transmission to and execution by the machine, and includes digital or analog communications signal or other intangible medium to facilitate transmission and communication of such software 192.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the description herein. Other embodiments may be utilized and derived therefrom, such that structural and logical substitutions and changes may be made without departing from the scope of this disclosure. FIGS. 1 to 9 are merely representational and may not be drawn to scale. Certain proportions thereof may be exaggerated, while others may be minimized. Accordingly, the specification and drawings are to be regarded in an illustrative rather than a restrictive sense.

The following description includes terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the Detailed Description, with each claim standing on its own as a separate embodiment.

Thus, embodiments describe a method and a system to set up and control secondary accounts. Although embodiments of the present invention have been described with reference to specific example embodiments, it will be evident that various modifications and changes may be made to these embodiments without departing from the broader spirit and scope of embodiments described herein.

The invention claimed is:

1. A method comprising:
  linking a secondary account to a primary account;
  establishing, within the secondary account, a spending account and a savings account;
  creating, using a processor of a machine, a savings goal in the savings account of the secondary account that enables a portion of the savings account of the secondary account to be set aside, the savings goal including a user indicated final goal amount to achieve the savings goal; and
  transferring funds of the savings goal in the secondary account directly to a third party providing a product corresponding to the savings goal to pay for the product in response to the user indicated final goal amount being met.

2. The method of claim 1, further comprising:
  receiving a parameter to automatically purchase the product corresponding to the savings goal in response to achieving the user indicated final goal amount; and
  triggering automatic purchase of the product corresponding to the savings goal in response to the user indicated final goal amount being met.

3. The method of claim 1, further comprising:
  receiving a selection of the product corresponding to the savings goal, the receiving of the selection causing the product to be placed on a layaway basis; and
  automatically purchasing the product with funds paid directly from the secondary account in response to the user indicated final goal amount being met.

4. The method of claim 1, further comprising allowing a primary account holder of the primary account to control or limit the savings goal of a secondary account holder of the secondary account.

5. The method of claim 1, further comprising dynamically monitoring a price of the product corresponding to the savings goal established in the secondary account.

6. The method of claim 1, further comprising:
  determining a savings status towards meeting the indicated final goal amount of the savings goal; and
  providing the savings status along a bar graph of a user interface to a secondary account holder of the secondary account.

7. The method of claim 1, further comprising performing a transfer of funds from the spending account of the secondary account to the savings goal of the secondary account.

8. The method of claim 7, further comprising establishing a recursive transfer of funds, wherein the transfer of funds occurs on a recursive scheduled basis.

9. The method of claim 1, further comprising:
receiving instructions to automatically deposit a portion of a funds deposit into the savings goal; and
automatically depositing the portion into the savings goal.

10. The method of claim 1, further comprising establishing a fund matching program for the savings goal that allows a primary account holder to match funds in the savings goal of the secondary account.

11. The method of claim 1, further comprising allowing a merchant to offer a selection from the group consisting of a discount for the product corresponding to the savings goal of the secondary account that is placed in an online layaway with the merchant, a sales incentive associated with the savings goal, and a lock-in on a sales price for the product corresponding to the savings goal.

12. A system comprising:
a processor of a machine;
at least one account management module to link a secondary account to a primary account and to establish a spending account and a savings account within the secondary account;
a savings module to create, using the processor of the machine, a savings goal in the savings account of the secondary account that enables a portion of the savings account of the secondary account to be set aside, the savings goal including a user indicated final goal amount to achieve the savings goal; and
a payment transfer module to transfer funds of the savings goal in the secondary account directly to a third party providing a product corresponding to the savings goal to pay for the product in response to the user indicated final goal amount being met.

13. A machine-readable storage medium in communication with at least one processor, the machine-readable medium storing instructions which, when executed by the at least one processor of a machine, cause the machine to perform operations comprising:
linking a secondary account to a primary account;
establishing, within the secondary account, a spending account and a savings account;
creating a savings goal in the savings account of the secondary account that enables a portion of the savings account of the secondary account to be set aside, the savings goal including a user indicated final goal amount to achieve the savings goal; and
transferring funds of the savings goal in the secondary account directly to a third party providing a product corresponding to the savings goal to pay for the product in response to the user indicated final goal amount being met.

14. The machine-readable storage medium of claim 13, wherein the operations further comprise allowing automatic purchase of the product corresponding to the savings goal in response to the user indicated final goal amount being met.

15. The machine-readable storage medium of claim 13, wherein the operations further comprise allowing selection of the product corresponding to the savings goal on a layaway basis.

16. The machine-readable storage medium of claim 13, wherein the operations further comprise dynamically monitoring a price of the product corresponding to the savings goal established in the secondary account.

17. The machine-readable storage medium of claim 13, wherein the operations further comprise:
determining a savings status towards meeting the indicated final goal amount of the savings goal; and
providing the savings status in a graphical format to a secondary account holder of the secondary account.

18. The machine-readable storage medium of claim 13, wherein the operations further comprise:
establishing a schedule for recursive transfers of funds from the spending account to the savings goal;
performing a transfer of the funds from the spending account to the saving goal according to the schedule.

19. The machine-readable storage medium of claim 13, wherein the operations further comprise:
receiving instructions to automatically deposit a portion of a funds deposit into the savings goal; and
automatically depositing the portion into the savings goal.

20. The machine-readable storage medium of claim 13, wherein the operations further comprise establishing a fund matching program for the savings goal that allows a primary account holder to match funds in the savings goal of the secondary account.

21. The method of claim 1, further comprising providing an option for a user to add a new savings goal including a new explicitly indicated goal amount for the new savings goal resulting in a plurality of savings goals in the secondary account, the option provided on a user interface displaying current savings goals.

* * * * *